US012749780B2

(12) United States Patent
Kim et al.

(10) Patent No.: US 12,749,780 B2
(45) Date of Patent: Sep. 29, 2026

(54) CURRENT COLLECTOR, SECONDARY BATTERY INCLUDING THE SAME, AND ELECTRONIC APPARATUS INCLUDING SECONDARY BATTERY

(71) Applicant: Samsung Electronics Co., Ltd., Suwon-si (KR)

(72) Inventors: Jirae Kim, Suwon-si (KR); Dooyeon Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 707 days.

(21) Appl. No.: 18/095,019

(22) Filed: Jan. 10, 2023

(65) Prior Publication Data

US 2023/0223664 A1 Jul. 13, 2023

(30) Foreign Application Priority Data

Jan. 10, 2022 (KR) ........................ 10-2022-0003634

(51) Int. Cl.
*H01M 50/54* (2021.01)
*H01M 50/109* (2021.01)
*H01M 50/528* (2021.01)

(52) U.S. Cl.
CPC ......... *H01M 50/54* (2021.01); *H01M 50/109* (2021.01); *H01M 50/528* (2021.01); *H01M 2220/30* (2013.01)

(58) Field of Classification Search
CPC ............... H01M 50/54; H01M 50/109; H01M 50/528; H01M 50/533; H01M 50/531; H01M 2220/30; H01M 4/70; H01M 10/427; H01M 10/04; H01M 10/0436; Y02E 60/10
See application file for complete search history.

(56) References Cited

U.S. PATENT DOCUMENTS

| | | | | |
|---|---|---|---|---|
| 5,098,800 | A | 3/1992 | Plichta et al. | |
| 6,312,848 | B1 * | 11/2001 | Kilb | H01M 50/54 429/57 |
| 7,846,579 | B2 | 12/2010 | Krasnov et al. | |
| 8,192,789 | B2 | 6/2012 | Albano et al. | |

(Continued)

FOREIGN PATENT DOCUMENTS

| | | |
|---|---|---|
| CN | 209029466 U | 6/2019 |
| CN | 209088011 U | 7/2019 |

(Continued)

OTHER PUBLICATIONS

H. Sato et al., "Fabrication of L11 type Co-Pt ordered alloy films by sputter deposition," Journal of Applied Physics 103, 07E114 (2008).

(Continued)

*Primary Examiner* — Adam J Francis
(74) *Attorney, Agent, or Firm* — CANTOR COLBURN LLP

(57) ABSTRACT

A current collector, a secondary battery including the same, and an electronic apparatus including the battery. The current collector includes a first conductive plate including first and second grooves, wherein the first and second grooves are configured to accommodate a fixing member, and wherein the first and second grooves are symmetrical to each other.

15 Claims, 25 Drawing Sheets

(56) References Cited

U.S. PATENT DOCUMENTS

| | | | |
|---|---|---|---|
| 8,491,673 B2 | 7/2013 | Daidoji et al. | |
| 8,597,722 B2 | 12/2013 | Albano et al. | |
| 8,614,017 B2 | 12/2013 | Mavattine | |
| 8,802,269 B2 | 8/2014 | Onishi et al. | |
| 8,900,743 B2 | 12/2014 | Kim et al. | |
| 8,906,449 B2 | 12/2014 | Li et al. | |
| 9,012,084 B2 | 4/2015 | Yada et al. | |
| 9,065,093 B2 | 6/2015 | Chiang et al. | |
| 2007/0259271 A1 | 11/2007 | Nanno et al. | |
| 2008/0060189 A1 | 3/2008 | Daidoji et al. | |
| 2010/0173204 A1 | 7/2010 | Sugiura et al. | |
| 2010/0221595 A1* | 9/2010 | Murata | H01G 11/12 429/128 |
| 2012/0009471 A1 | 1/2012 | Sugiura et al. | |
| 2012/0135292 A1 | 5/2012 | Buckingham et al. | |
| 2014/0079979 A1* | 3/2014 | Kwon | H01M 50/54 429/127 |
| 2015/0243938 A1 | 8/2015 | Kim et al. | |
| 2015/0287968 A1* | 10/2015 | Maguire | H01M 50/289 429/148 |
| 2016/0204464 A1 | 7/2016 | Cho et al. | |
| 2016/0204477 A1 | 7/2016 | Yang et al. | |
| 2016/0315296 A1* | 10/2016 | Kimura | H01M 10/0413 |
| 2017/0040607 A1 | 2/2017 | Cho et al. | |
| 2017/0047582 A1 | 2/2017 | Park et al. | |
| 2017/0084918 A1 | 3/2017 | Yang et al. | |
| 2018/0013119 A1 | 1/2018 | Yang et al. | |
| 2018/0062212 A1 | 3/2018 | Kim et al. | |
| 2018/0123115 A1 | 5/2018 | Kato et al. | |
| 2019/0348718 A1* | 11/2019 | Kawai | H01M 10/0585 |
| 2021/0384482 A1 | 12/2021 | Deng | |
| 2022/0059910 A1* | 2/2022 | Sun | H01M 50/417 |
| 2022/0231320 A1* | 7/2022 | Wang | H01M 50/54 |
| 2022/0407056 A1 | 12/2022 | Park et al. | |
| 2023/0033080 A1* | 2/2023 | Yebka | H01M 10/0427 |

FOREIGN PATENT DOCUMENTS

| | | | |
|---|---|---|---|
| CN | 212783706 | U | 3/2021 |
| JP | 2008066170 | A | 3/2008 |
| JP | 2008117559 | A | 5/2008 |
| JP | 2012099405 | A | 5/2012 |
| JP | 5114036 | B2 | 10/2012 |
| JP | 5164155 | B2 | 12/2012 |
| JP | 2018073644 | A | 5/2018 |
| JP | 2018129153 | A | 8/2018 |
| JP | 3230968 | U | 2/2021 |
| KR | 100622199 | B1 | 9/2006 |
| KR | 101374849 | B1 | 3/2014 |
| KR | 101690688 | B1 | 12/2016 |
| KR | 20180025685 | A | 3/2018 |
| WO | 2006064774 | A1 | 6/2006 |
| WO | 2018173751 | A1 | 9/2018 |

OTHER PUBLICATIONS

Hiroaki Sukegawa et al., "MgGa2O4 spinel barrier for magnetic tunnel junctions: Coherent tunneling and low barrier height," Applied Physics Letters 110, 122404 (2017).

Hiroaki Sukegawa et al., "Tunnel magnetoresistance with improved bias voltage dependence in lattice-matched Fe/spinel MgAl204/ Fe,,001 . . . junctions," Applied Physics Letters 96, 212505 (2010).

Keisuke Masuda et al., "Interface-driven giant tunnel magnetoresistance in (111)-oriented junctions," Physical Review B 101, 144404 (2020).

Keisuke Masuda et al., "Interfacial giant tunnel magnetoresistance and bulk-induced large perpendicular magnetic anisotropy in (111)-oriented junctions with fcc ferromagnetic alloys: A first-principles study," Physical Review B 103, 064427(2021).

S. Mitani et al., "Fabrication and Characterization of L10-Ordered FePt/AlO/FeCo Magnetic Tunnel Junctions," IEEE Transactions On Magnetics, vol. 41, 2606 (2005).

* cited by examiner

CURRENT COLLECTOR, SECONDARY BATTERY INCLUDING THE SAME, AND ELECTRONIC APPARATUS INCLUDING SECONDARY BATTERY

CROSS-REFERENCE TO RELATED APPLICATION

This application claims priority to and the benefit of Korean Patent Application No. 10-2022-0003634, filed on Jan. 10, 2022, in the Korean Intellectual Property Office, and all the benefits accruing therefrom under 35 U.S.C. § 119, the content of which in its entirety is herein incorporated by reference.

BACKGROUND

1. Field

The disclosure relates to a battery and, more specifically, to a current collector, a secondary battery including the same, and an electronic device including the battery.

2. Description of the Related Art

A secondary battery may be charged and discharged several times, and use of a secondary battery may be high compared to a primary battery, e.g., use of a secondary battery may be preferred over use of a primary battery. Secondary batteries may be used in various fields and devices.

With the development of industrial technology and the advent of new devices, secondary batteries with higher energy density are desired. Accordingly, secondary batteries having various structures such as stacked cell structures have been introduced.

For secondary batteries used in small devices, an increase in energy density may be limited as volumes of the secondary batteries decrease with a decrease in sizes of the devices. This results in an increase in the number of times secondary batteries are charged and discharged, and eventually the life of the secondary batteries may be shortened.

SUMMARY

An embodiment provides a current collector having a structure capable of accommodating a step existing in an applied portion, e.g., present in a cell stack in which the current collector may be used, while increasing a contact area.

An embodiment provides a secondary battery including such a current collector.

An embodiment provides a secondary battery having an optimized electrode structure inside the battery.

An embodiment provides an electronic apparatus including such a secondary battery.

Additional aspects will be set forth in portion in the description which follows and, in portion, will be apparent from the description, or may be learned by practice of the presented embodiments of the disclosure.

A current collector in accordance with an embodiment includes a first conductive plate including first and second grooves, wherein the first and second grooves are configured to accommodate a fixing member, and wherein the first and second grooves are symmetrical to each other. In an embodiment, the current collector may further include a second conductive plate connected to the first conductive plate, the second conductive plate including third and fourth grooves, and a third conductive plate connected to the second conductive plate, the third conductive plate including fifth and sixth grooves each configured to provide the current collector with elasticity, wherein the third and fourth grooves may be symmetrical to each other, the fifth and sixth grooves may be symmetrical to each other, the third groove, fourth groove, fifth groove, and sixth groove may be provided at positions overlapping the first and second grooves, and the first conductive plate, second conductive plate, and third conductive plate may be a contiguous body.

A secondary battery according to an embodiment includes: a first current collector; a second current collector arranged to face the first current collector; a cell stack, which is provided between the first and second current collectors, the cell stack including a plurality of stacked unit cells; first and second fixing members spaced away from each other to fix the cell stack; a plurality of primary current collectors provided on the side surfaces of the cell stack, wherein at least two of the primary current collectors are connected to the first current collector, and a remainder of the primary current collectors are connected to the second current collector; and a case accommodating the first and second current collectors, the cell stack, the first and second fixing members, and the plurality of primary current collectors. The cell stack may include a plurality of nonparallel linear sides, wherein at least one of the primary current collectors is on each of the linear sides, and the first and second current collectors may be on the cell stack between the first and second fixing members, and each of the first and second current collectors may include a groove configured to accommodate portions of the first and second fixing members.

In an embodiment, each of the first and second fixing members may include a jig covering portions of the side surfaces of the cell stack and covering portions of the first and second surfaces of the cell stack, and the first and second fixing members may be symmetrical. In an embodiment, a number of primary current collectors present in the secondary battery may be greater than or equal to four and less than or equal to a number of unit cells present in the cell stack. In an embodiment, the first current collector may include first and second bonding portions connected to at least two of the plurality of primary current collectors, the first and second boding portions being spaced apart from each other. In an embodiment, the second current collector may include third and fourth bonding portions connected to at least two of the plurality of primary current collectors, the third and fourth bonding portions being spaced apart from each other. In an embodiment, the cell stack may include: a first side surface that is linear; and a second side surface that is linear, the second side surface being nonparallel with the first side surface and symmetrical to the first side surface, wherein two of the primary current collectors may be provided on each of the first and second side surfaces. In an embodiment, the first side surface and the second side surface may form an acute angle, a right angle, or an obtuse angle with each other.

In an embodiment, a first primary current collector of the two primary current collectors provided in the first side surface may be connected to a portion of the current collector layer of the first electrode layer of each of the plurality of unit cells, and a second primary current collector of the two primary current collectors may be connected to a remaining portion of the current collector layer. In an embodiment, a first primary current collector of the two primary current collectors provided in the second side surface may be connected to a portion of the current collector layer of the second electrode layer of each of the plurality of unit cells, and a second primary current collector of the two primary current collectors may be connected to a remaining portion of the current collector layer.

In an embodiment, each of the first and second current collectors may have a thickness corresponding to a distance between the cell stack and each of the first and second fixing members.

In an embodiment, the cell stack may include: a first side surface that is linear; a second side surface that is liner and nonparallel with the first side surface; a third side surface that is liner and nonparallel with the first and second side surfaces; and a fourth side surface that is liner and nonparallel with the first side surface, second side surface, and third side surface, wherein one primary current collector may be provided on each of the first side surface, second side surface, third side surface, and fourth side surface. In an embodiment, a portion of the current collector layer of the first electrode layer of each of the plurality of unit cells may be connected to the primary current collector provided on the first side surface, and a remaining portion may be connected to the primary current collector provided on the second side surface. In an embodiment, the current collector layer of the first electrode layer of each of the plurality of unit cells includes a tab connected to the primary current collector provided on one of the first and second side surfaces, and the position of a tab formed in a portion of the current collector layer of the first electrode layer and the position of a tab located on a remaining portion of the current collector layer of the first electrode layer may be different from each other.

In an embodiment, a portion of the current collector layer of the second electrode layer of each of the plurality of unit cells may be connected to the primary current collector provided on the third side surface, and a remaining portion may be connected to the primary current collector provided on the fourth side surface. In an embodiment, the current collector layer of the second electrode layer of each of the plurality of unit cells includes a tab connected to the primary current collector provided on one of the third and fourth side surfaces, and the position of a tab located in a portion of the current collector layer of the second electrode layer and the position of a tap located on a remaining of the current collector layer of the second electrode layer may be different from each other.

In an embodiment, the first and second side surfaces may be symmetrical to the third and fourth side surfaces. One of the first and second side surfaces and one of the third and fourth side surfaces may form an acute angle, a right angle, or an obtuse angle with each other. In an embodiment, each of the unit cells include: a first electrode layer; a second electrode layer arranged face the first electrode layer; a separator arranged between the first and second electrode layers; a first current collector layer in contact with the first electrode layer and arranged in a first direction; a second current collector layer in contact with the second electrode layer, spaced apart from the first current collector layer, and arranged in a second direction; and an electrolyte supplied between the first and second electrode layers, and the first direction and the second direction may form an acute angle, a right angle, or an obtuse angle. The separator may include position tabs for alignment of the first and second current collector layers.

In an embodiment, the current collector layer of the first electrode layer of each of the plurality of unit cells may be connected to the primary current collectors provided in the first and second side surfaces.

In an embodiment, the current collector layer of the second electrode layer of each of the plurality of unit cells may be connected to the primary current collectors provided in the third and fourth side surfaces.

An electronic apparatus according to an embodiment includes: a control unit for controlling the operation of the apparatus; and a battery, and the battery includes a secondary battery according to the embodiment. In an embodiment, the electronic apparatus may include a wearable device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
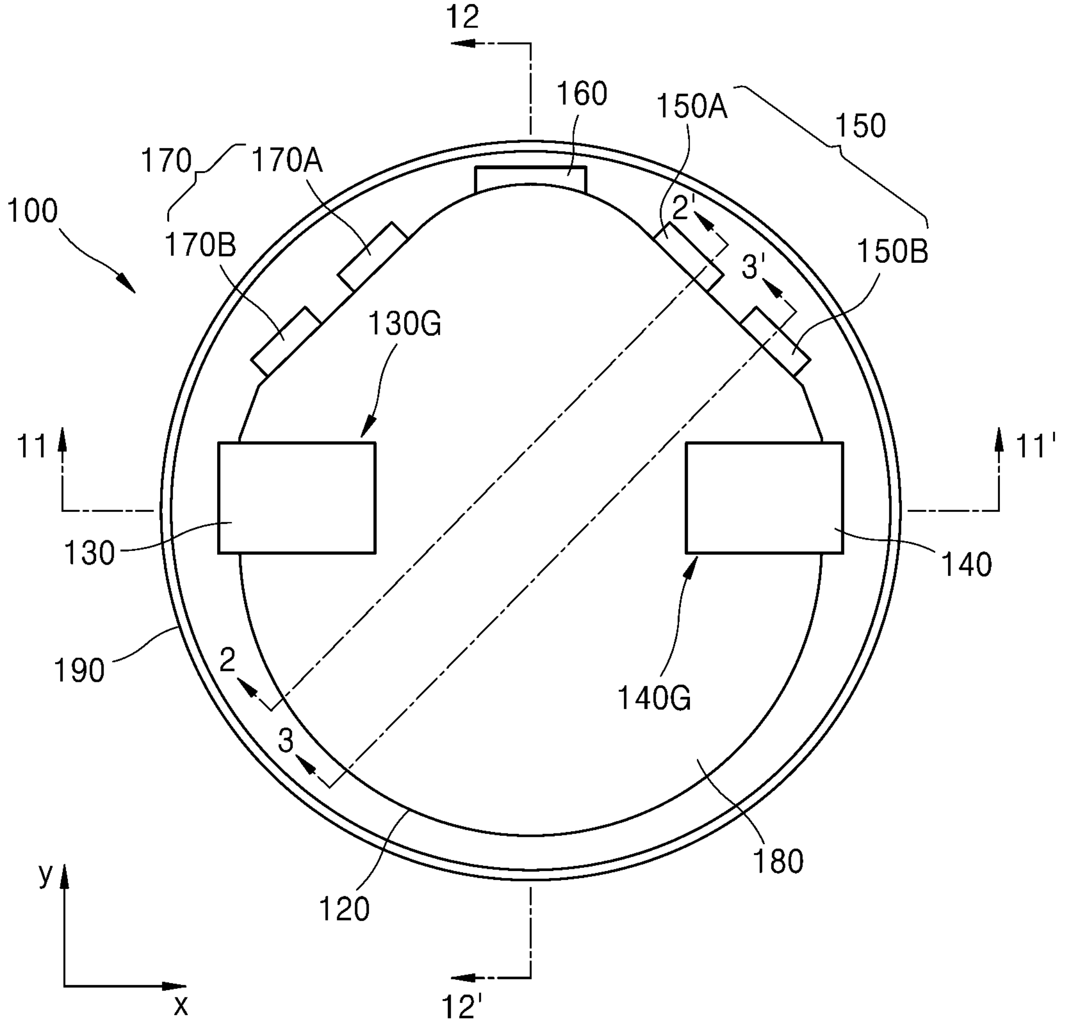
FIG. 1 is a plan view of an embodiment of a coin-type cell.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a current collector, a secondary battery including the current collector, and an electronic apparatus including the secondary battery according to example embodiments will be described in detail with reference to the accompanying drawings.

In the following description, the thickness of the layers or regions illustrated in the drawings may be somewhat exaggerated for clarity of the specification. In addition, the embodiments described below are only illustrative, and various modifications are possible from these embodiments. In addition, in the layer structure described below, the expressions "upper portion" or "on" may include not only the case that one element is directly on another element in a contact manner, but also the case that one element is above another element in a contactless manner.

It will be understood that, although the terms "first," "second," "third," etc. may be used herein to describe various elements, components, regions, layers, and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used, e.g., non-technical, dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 illustrates an embodiment of a coin type cell secondary battery.

Referring to FIG. 1, a stack cell 120 and first and second insulating jigs 130 and 140 are included in a case 190 of a coin type cell 100. In an embodiment, the stack cell 120 may occupy 85% or greater to less than 100% or 90% or greater to less than 100% of the inner space of the case 190.

The stack cell 120 includes a plurality of cells vertically stacked on the bottom of the case 190. On a plane, e.g., in a plan view, the shape of the stack cell 120 is similar to that of the case 190. That is, the edge boundary of the stack cell 120 viewed in a plan view may be close to, e.g., adjacent, the inner boundary of the case 190. In an embodiment, the inner boundary of the case 190 may be circular, and at least half of the edge boundary of the stack cell 120 corresponds to an arc of a circle concentric with the inner boundary of the case 190. The rest of the edge boundary of the stack cell 120 may include a portion of the arc and two linear sections. The linear section represents a portion with a flat (also referred to herein as linear) side, e.g., side surface.

The ratio, e.g., percentage, occupied by the linear sections in the entire edge boundary of the stack cell 120 is small. The two linear sections are spaced apart from each other. The length of each linear section is not long enough to significantly deviate the entire shape, e.g., perimeter, of the edge boundary of the stack cell 120 from a circular shape.

The linear sections may exist at the edge boundary of the stack cell 120, and the edge boundary of the stack cell 120 may be close to, e.g., resemble, a circle. Accordingly, the area occupied by the stack cell 120 in the case 190 may be increased. In other words, the area occupied by the electrode of the cell in the inner area of the case 190 may be increased. This suggests that the energy density of the stack cell 120 may be increased.

A current collector 150 of a first electrode and a current collector 170 of a second electrode are provided between each of the two linear sections and the case 190. The current collector 150 of the first electrode and the current collector 170 of the second electrode are in contact with the two linear sections, respectively, and are spaced apart from the case 190.

One of the current collector 150 of the first electrode and the current collector 170 of the second electrode may be a current collector of a positive electrode, and the other may be a current collector of a negative electrode. The current collector of the positive electrode refers to a current collector belonging to the positive electrode or a current collector in contact with the positive electrode, and the current collector of the negative electrode refers to a current collector belonging to the negative electrode or a current collector in contact with the negative electrode.

In an embodiment, the current collector 150 of the first electrode may include a first current collector tab 150A and a second current collector tab 150B. The first current collector tab 150A and the second current collector tab 150B are spaced apart from each other. The first current collector tab 150A may be connected to a portion of a current collector layer of the first electrode stacked of the stack cell 120, and the second current collector tab 150B may be connected to the rest of the current collector layer of the stacked first electrode of the stack cell 120. In an embodiment, the first and second current collector tabs 150A and 150B may be combined into one current collector tab. That is, the current collector 150 of the first electrode may include only one current collector tab connected to all of the current contact layers of the stacked first electrode of the stack cell 120.

For example, the current contact layers of the stacked first electrode of the stack cell 120 may have portions extending outwardly, and the extended portions may be combined to form one current collector tab.

The current collector 170 of the second electrode may be disposed perpendicular to the current collector 150 of the first electrode. In other words, the current collector 170 of the second electrode may be provided at a position where the current collector 150 of the first electrode is rotated by 90° counterclockwise. The current collector 170 of the second electrode may include a third current collector tab 170A and a fourth current collector tab 170B. The third current collector tab 170A and the fourth current collector tab 170B are spaced apart from each other. The third current collector tab 170A may be connected to a portion of the current collector layer of the stacked second electrode of the stack cell 120, and the fourth current collector tab 170B may be connected to the rest of the current collector layer of the stacked second electrode of the stack cell 120. In an embodiment, the third and fourth current collector tabs 170A and 170B may be combined into one current collector tab. That is, the current collector 170 of the second electrode may include only one current collector tab connected to all of the current contact layers of the stacked second electrode of the stack cell 120.

One of the current collector 150 of the first electrode and the current collector 170 of the second electrode may contact the upper current collector 180 (also referred to herein as a first current collector) corresponding to the uppermost layer of the stack cell 120, and the other may contact the lower current collector 182 (also referred to herein as a second current collector) (of FIG. 2) corresponding to the lowermost layer of the stack cell 120. Depending on the viewpoint, the upper current collector 180 may be expressed, e.g., described, as a lower current collector, and the lower current collector 182 may be expressed, e.g., described, as an upper current collector. In addition, the current collectors 150 and 170 of the first and second electrodes may be represented by a "primary current collector", respectively, and the upper and lower current collectors 180 and 182 may be represented by a "secondary current collector", respectively. The upper and lower current collectors 180 and 182 may be represented as "cell current collectors" in that they collect current of the entire stack cell 120.

One of the upper current collector 180 and the lower current collector 182 may be connected (or in contact) with the current collector 150 of the first electrode, and the other may be connected (or in contact) with the current collector 170 of the second electrode. In an embodiment, the upper current collector 180 may be connected to the positive electrode side, and the lower current collector 182 may be connected to the negative electrode side.

The current collector 150 of the first electrode and the current collector 170 of the second electrode may be provided to be symmetrical to each other.

A separator position tap 160 is provided on an arc between the current collector 150 of the first electrode and the current collector 170 of the second electrode. The separator position tab 160 is positioned between the edge boundary of the stack cell 120 and the case 190. The separator position tab 160 contacts the stack cell 120 and is spaced apart from the case 190. When the unit cells of the stack cell 120 are stacked, the separator position tab 160 may include a member for correctly aligning the position of the unit cells. The separator position tab 160 may include a combination of a portion (tab) in which a portion of the separator is extended. In the process of forming the stack cell 120, separators may be stacked and the extended portions of the separators may vertically and accurately overlap each other.

Each of the plurality of positive and negative electrode layers included in the stack cell 120 may also have an extended tab, and may be stacked in the same alignment method as the alignment method when the separator is stacked using the tab.

The first and second insulating jigs 130 and 140 may be spaced apart from each other and may be provided to be symmetrical to each other. The first and second insulating jigs 130 and 140 may be provided at the same position in the y-axis direction. The first and second insulating jigs 130 and 140 may be fixing members for fixing the remaining stacks except for the upper and lower current collectors 180 and 182 from among a plurality of stacks forming the stack cell 120.

The top layer of the stack cell 120 may be an upper current collector 180. The upper current collector 180 may cover the remaining regions of the stack cell 120 except for portions covered by the first and second insulating jigs 130 and 140 from among the regions viewed from the plan view of the stack cell 120. The upper current collector 180 includes first and second grooves 130G and 140G. The first groove 130G is a groove for accommodating the first insulating jig 130. The second groove 140G is a groove for accommodating the second insulating jig 140.

Figure 2:
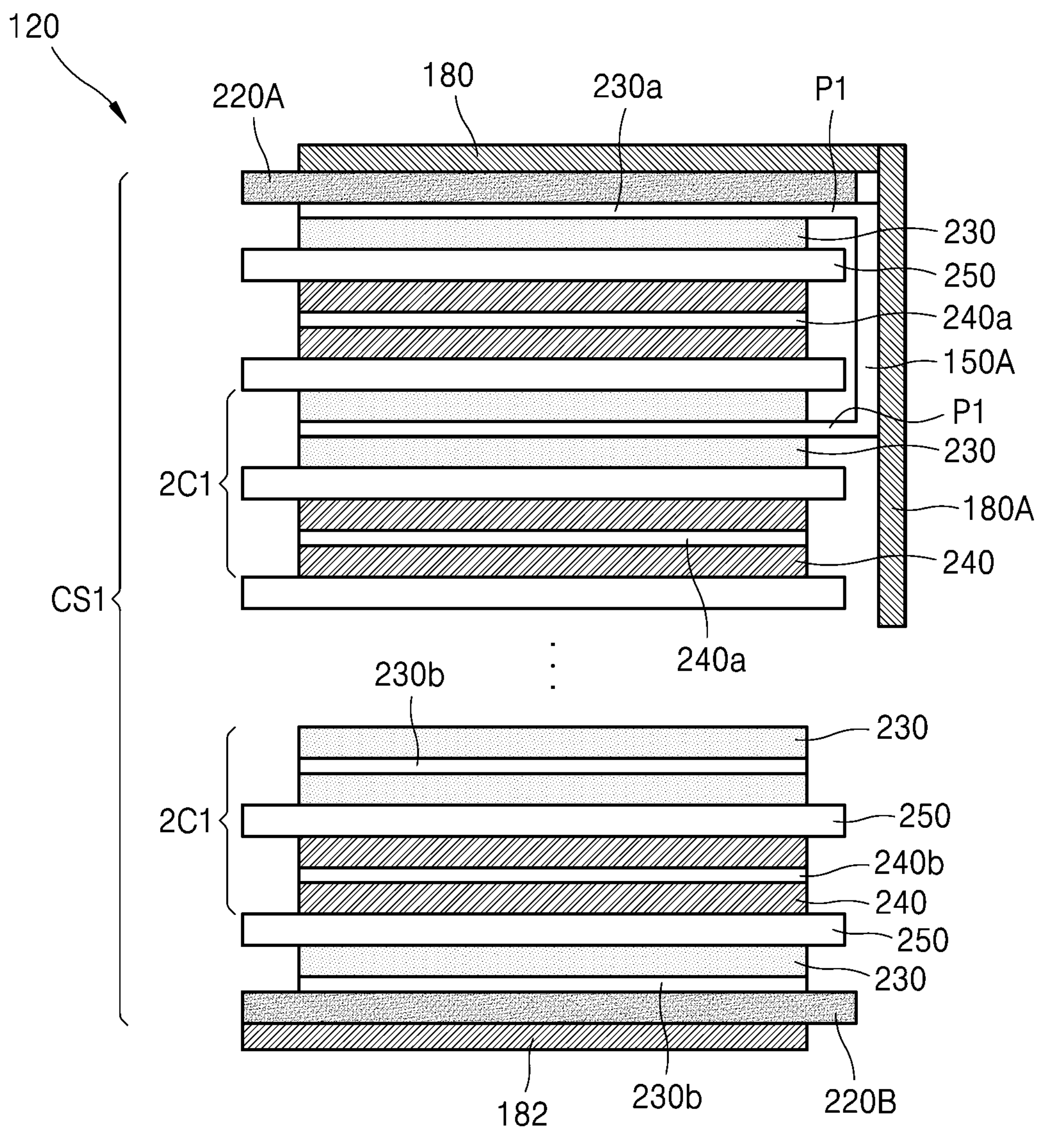
FIG. 2 is a cross-sectional view of the coin-type cell of FIG. 1 taken along line 2-2' in FIG. 1.

FIG. 2 illustrates a cross section of the stack cell 120 taken along a 2-2' direction of FIG. 1.

Referring to FIG. 2, the stack cell 120 includes the upper current collector 180 on the uppermost layer and the lower current collector 182 on the lowermost layer. The upper and lower current collectors 180 and 182 are vertically disposed to face each other. In an embodiment, the upper current collector 180 is provided above the lower current collector 182. First and second insulating layers 220A and 220B are arranged between the upper and lower current collectors 180 and 182. The first and second insulating layers 220A and 220B are spaced apart from each other, and the first insulating layer 220A is present above the second insulating layer 220B. The first and second insulating layers 220A and 220B are vertically disposed to face each other. Widths of the first and second insulating layers 220A and 220B in the horizontal direction may be the same. In an embodiment, widths of the first and second insulating layers 220A and 220B in the horizontal direction may not be the same. The first insulating layer 220A may be in contact with the lower portion of the upper current collector 180 and may cover the entire bottom surface (also referred to herein as a second surface) of the upper current collector 180. The second insulating layer 220B may be in contact with the lower current collector 182 on the lower current collector 182. The second insulating layer 220B may be provided to cover the entire upper surface (also referred to herein as a first surface) of the lower current collector 182, and contact between the lower current collector 182 and a positive electrode current collector layer 240*a* provided thereon may be prevented. Each of the first and second insulating layers 220A and 220B may have a portion protruding longer than the upper and lower current collectors 180 and 182 in the lateral direction.

A plurality of unit cells 2201 are stacked between the first insulating layer 220A and the second insulating layer 220B. The plurality of unit cells 2C1 are vertically stacked on the second insulating layer 220B toward the first insulating layer 220A. The number of unit cells 2C1 stacked between the first and second insulating layers 220A and 220B may be several to hundreds, but is not limited thereto. For example, about 5 to 100 unit cells 2C1 may be stacked between the first and second insulating layers (220A and 220B), but the number of unit cells 2C1 stacked between the first and second insulating layers 220A and 220B is not limited thereto.

A first electrode layer (first active material layer) 230 and a first current collector layer 230*a* are arranged between the first insulating layer 220A and the first separator 250 below the first insulating layer 220A. The first electrode layer 230 and the first current collector layer 230*a* are sequentially stacked on the separator 250. In an embodiment, the first insulating layer 220A and the first separator 250 below the first insulating layer 220A may directly contact each other without including the first electrode layer 230 and the first current collector layer 230*a* therebetween.

The first current collector layer 230*b* and the first electrode layer 230 exist between the second insulating layer 220B and the first separator 250 thereon. The first current collector layer 230*b* and the first electrode layer 230 are sequentially stacked on the second insulating layer 220B.

The unit cell 22C1 is formed on the first separator 250 on the second insulating layer 220B. The unit cell 2C1 includes a second electrode layer (second active material layer) 240, a separator 250, and a first electrode layer (first active material layer) 230 that are sequentially stacked. One of the first and second electrode layers 230 and 240 may be a positive electrode layer, and the other may be a negative electrode layer. In an embodiment, horizontal lengths (or diameters) of the first and second electrode layers 230 and 240 may be the same as or different from each other. For example, the length of the electrode layer used as the positive electrode layer may be longer than the length used as the negative electrode layer or vice versa.

A ratio, e.g., percentage, of the electrode layer having a relatively small area of the first and second electrode layers 230 and 240 of the unit cell 2C1, which is occupied in the inner bottom area of the case 190 may be 80% or greater to less than 100%, or 90% or greater to less than 100%. The first electrode layer 230 may include the first current collector layer 230*a*. In an embodiment, the first electrode layer 230 may include a first active material layer coated on one or both surfaces of the first current collector layer 230*a*. In the stack cell 120, the first current collector layer 230*a* belonging to the upper layer may have a portion P1 extending outside the first electrode layer 230, that is, a protruding portion (tab). The first current collector layer 230*b* belonging to the lower layer of the stack cell 120 may also have an extended portion (not shown in the cross section of FIG. 2). For example, the stack cell 120 may include 10 unit cells, and the first current collector layers included in the first to fifth unit cells may belong to the upper layer, and the extended portions thereof may be illustrated in FIG. 2. In an embodiment, the first current collector layers included in the sixth to tenth unit cells may belong to the lower layer, and the extended portions thereof are not shown in the cross section of FIG. 2.

The extended portion P1 of each unit cell 2C1 in the upper layer is connected to the first current collector tab 150A. The first current collector tab 150A is a combination of the extended portion P1 of each unit cell 2C1 belonging to the upper layer, and the first current collector tab 150A and the extended portion P1 of each unit cell 2C1 may include the same material, and may be viewed as, e.g., considered, a continuous material layer.

The upper current collector 180 may extend downward, e.g., in a direction towards the lower current collector 182, by a given length along a side surface of the stack cell 120. The first current collector tab 150A may be covered by a portion 180A extending downward from the upper current collector 180, e.g., extending in a direction towards the lower current collector 182. The first current collector tab 150A may be in direct contact with the extended portion 180A of the upper current collector 180. In an embodiment, the first current collector tab 150A and the extended portion 180A may be electrically bonded. Such electrical bonding may be formed by ultrasonic welding or spot welding.

The second electrode layer 240 includes a second current collector layer 240*a*. In an embodiment, the second electrode layer 240 may include a second active material layer coated on one or both surfaces of the second current collector layer 240*a*. Although not shown in FIG. 2, the second current collector layer 240*a* may also have a portion extended out of, e.g., extending further than, the second electrode layer 240 as in the case of, e.g., similar to, the first current collector layer 230*a*. The extended portions are combined to form a third current collector tab 170A or a fourth current collector tab 170B. The extended portion of the second current collector layer 240*a* may be viewed in a cross-sectional view taken along a direction including the current collector 170 of the second electrode of FIG. 1.

In the first and second electrode layers 230 and 240, the first and second current collector layers 230*a* and 240*a* may have various shapes or forms of arrangement, which will be described later.

The separator 250 prevents direct contact between the first and second electrode layers 230 and 240. The length of the separator 250 in the transverse direction perpendicular to the stacking direction of the separator 250, e.g., the stacking direction of the stack cell 120, is greater than the lengths of the first and second electrode layers 230 and 240 in the transverse direction perpendicular to the stacking direction of the first and second electrode layers 230 and 240, e.g., the stacking direction of the stack cell 120. The separator 250 may have a portion extended out of, e.g., extending further than, the first and second electrode layers 230 and 240 in both lateral directions, e.g., the separator 250 may have a portion protruding farther than the edges of the first and second electrode layers 230 and 240 in both lateral directions.

Figure 3:
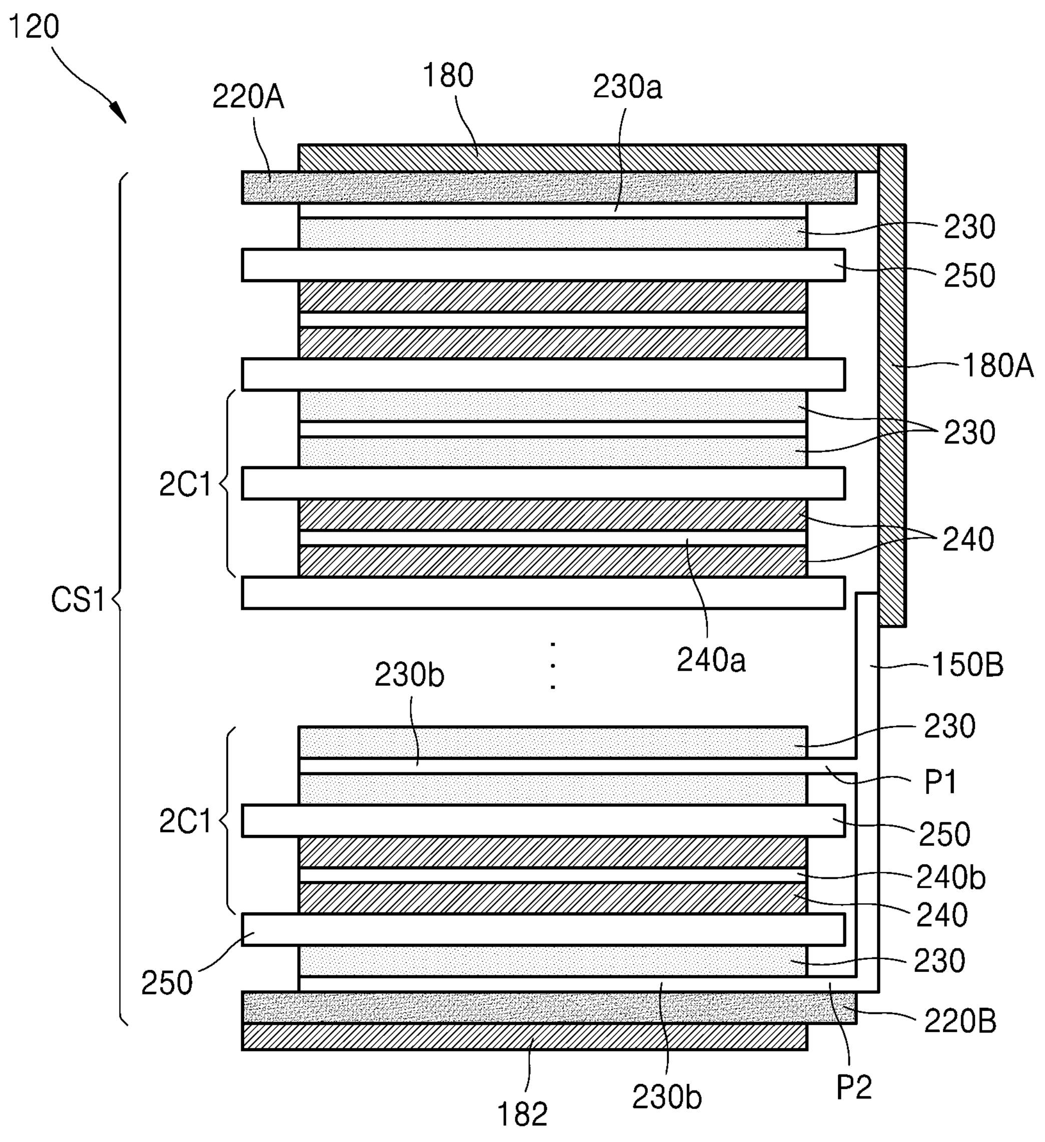
FIG. 3 is a cross-sectional view of the coin-type cell of FIG. 1 taken along line 3-3' in FIG. 1.

FIG. 3 shows a cross-section of the stack cell taken along a 3-3' direction of FIG. 1.

Referring to FIG. 3, the first current collector layer 230*b* of the unit cell 2C1 in the lower layer portion of the stack cell 120 also has an extended portion P1 to the outside. The extended portion P1 of the first current collector layer 230*b* of the lower layer portion is connected to the second current collector tab 150B. The second current collector tab 150B is a combination of the expanded portions P1 of the first current collector layer 230*b* belonging to the lower layer portion, and the second current collector tab (150B) and the extended portions (P1) of the first current collector layers 230*b* may be of the same material, and can be seen, e.g., considered, as a continuous material layer.

At least a portion of the second current collector tab 150B may be covered with the portion 180A extending below the upper current collector 180. In an embodiment, the upper end or a predetermined portion below from the upper end of the second current collector tab 150B may be bonded to the extended portion 180A of the upper current collector 180 in the electrical bonding manner.

Referring to FIGS. 2 and 3, the extended portion 180A extending below the upper current collector 180 is bonded to both the first and second current collector tabs 150A and 150B.

Hereinafter, a portion of the stack cells 120 of FIGS. 2 and 3 excluding the upper and lower current collectors 180 and 182 is referred to as a cell stack CS1.

Although not shown in FIGS. 2 and 3, the cell stack CS1 includes an electrolyte. The electrolyte solution may be provided in a form in which the electrolyte is permeated into the unit cell 2C1. In a manufacturing process of a coin type cell 100 of FIG. 1 as a method of supplying the electrolyte to the cell stack CS1, after the upper and lower current collectors 180 and 182 are bonded to the current collector 150 of the first electrode and the current collector 170 of the second electrode, the stack cell 120 may be immersed in the electrolyte for a given time. That is, the stack cell 120 illustrated in FIG. 15 may be immersed in the electrolyte and the electrolyte may permeate into the unit cell 2C1. In an embodiment, the electrolyte may be supplied to the stack cell 120 by directly pouring the electrolyte into the stack cell 120.

The arrangement, contact, and bonding relationship between the first current collector layer 230*a*, the first and second current collector tabs 150A and 150B, and the portion 180A extended below the upper current collector 180 may apply to the arrangement, contact, and bonding between the second current collector layer 240*a* of the unit cell 2401, the third and fourth current collector tabs 170A and 170B, and the lower current collector 182.

Figure 4A:
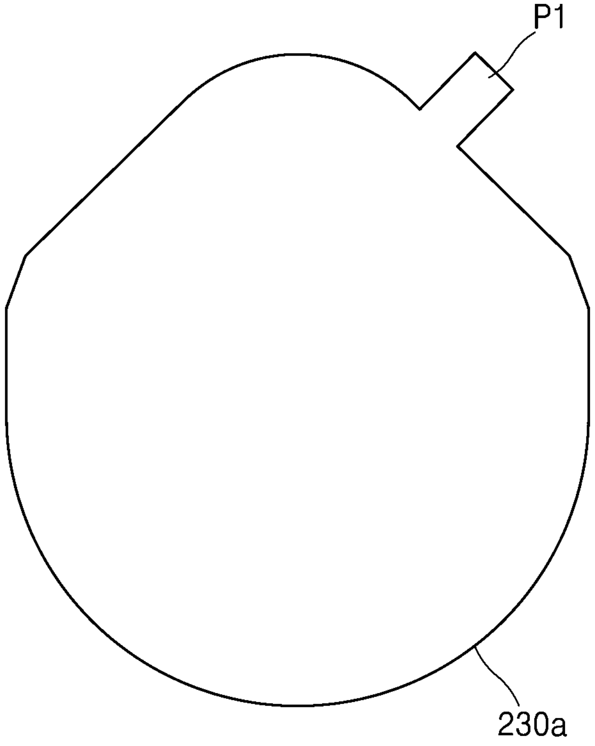
FIG. 4A is a plan view of a first current collector layer of a unit cell included in a stack cell of the coin-type cell of FIG. 1.
Figure 4B:
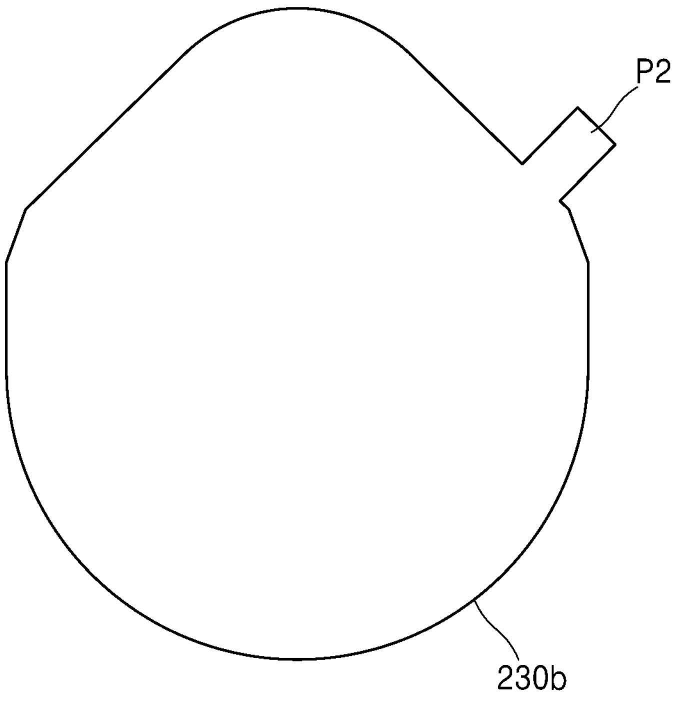
FIG. 4B is a plan view of a first current collector layer of a unit cell included in a stack cell of the coin-type cell of FIG. 1.

FIG. 4A shows a plan view illustrating the first current collector layer 230*a* included in the stack cell 120 of a coin type cell 100 shown in FIGS. 1 and 2. FIG. 4B shows a plan view illustrating the first current collector layer 230*b* included in the stack cell 120 of a coin type cell 100 shown in FIGS. 1 and 2.

FIG. 4A illustrates the first current collector layer 230*a* included in the upper layer portion of the stack cell 120, and FIG. 4B illustrates the first current collector layer 230*b* included in the lower layer portion of the stack cell 120.

Comparing 4A and FIG. 4B, the first current collector layer 230*a* included in the upper layer portion of the stack cell 120 and the first current collector layer 230*b* included in the lower layer portion have the same size and shape, but the positions of the extended portions P1 and P2 are different from each other. The position of the extended portion P1 of the first current collector layer 230*a* shown in FIG. 4A corresponds to the position of the first current collector tab 150A. The position of the extended portion P2 of the first current collector layer 230*b* shown in FIG. 4B corresponds to the position of the second current collector tab 150B.

The extended portions P1 and P2 protruding in a direction perpendicular to the flat inclined surface shown on the righthand side of FIG. 4A and FIG. 4B may instead be positioned symmetrically to the left and right, e.g., mirrored vertically, protruding in a direction away from, e.g., perpendicular to, the flat inclined surface shown on the lefthand side of FIG. 4A and FIG. 4B, which would provide the second current collector layer 240*a* of the unit cell 240 included in the upper layer portion of the stack cell 120, and the second current collector layer 240*b* of the unit cell 240 included in the lower layer portion of the stack cell 120.

Figure 5:
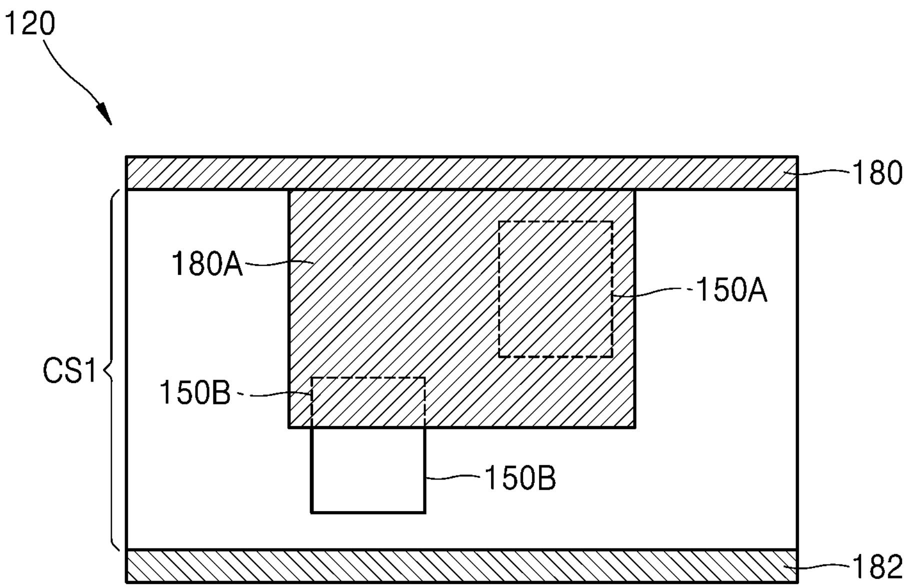
FIG. 5 is a front view of a side surface on which is provided a current collector of a first electrode of a stack cell of the coin-type cell of FIG. 1.

FIG. 5 is a front view of a side surface of the stack cell 120 of FIG. 1 provided with the first current collector 150.

Referring to FIG. 5, the upper current collector 180 is present on the upper surface of the cell stack CS1, and the lower current collector 182 is formed on the lower surface (bottom surface). The portion 180A extending downward, e.g., in a direction towards the lower current collector 182, along the side surface of the cell stack CS1 of the upper current collector 180 covers the first and second current collector tabs 150A and 150B. The extended portion 180A is spaced apart from the lower current collector 182. The first current collector tab 150A is completely covered with the extended portion 180A. The second current collector tab 150B is partially covered by the extended portion 180A. In an embodiment, the second current collector tab 150B may be entirely covered like, e.g., similar to, the first current collector tab 150A.

The first and second current collector tabs 150A and 150B are horizontally spaced apart from each other. The first and second current collector tabs 150A and 150B are vertically at different heights. In an embodiment, the first and second current collector tabs 150A and 150B may be at the same height by adjusting the number of extended portions P1 and P2, respectively provided in the first current collector layers 230*a* and 230*b* connected to the first and second current collector tabs 150A and 150B, or changing the vertical stacking method of the first current collector layers 230*a* and 230*b*.

Figure 6:
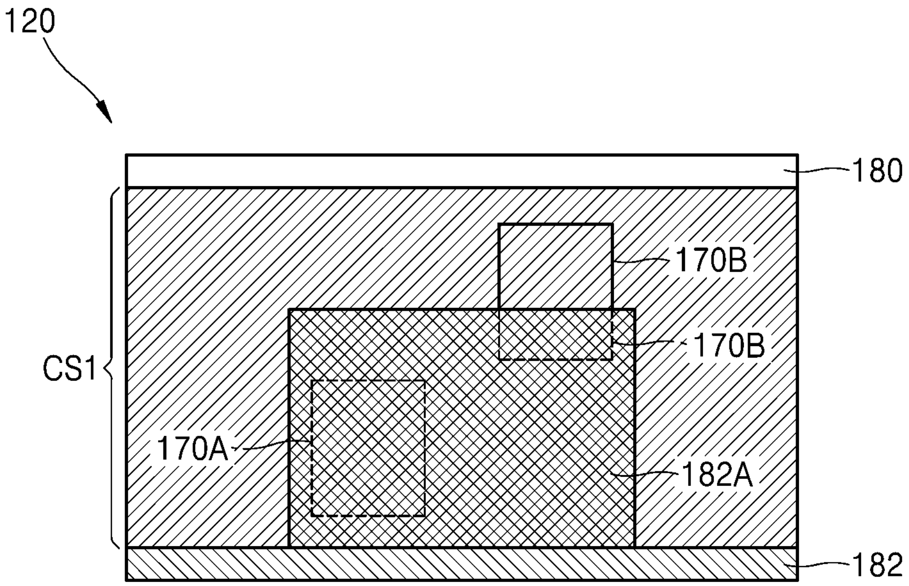
FIG. 6 is a front view of a side surface on which is provided a current collector of a second electrode of a stack cell of the coin-type cell of FIG. 1.

FIG. 6 is a front view of a side surface of the stack cell 120 of FIG. 1 provided with the second current collector 170. Only portions of FIG. 6 different from portions of FIG. 5 will be described.

Referring to FIG. 6, third and fourth current collector tabs 170A and 170B are present between the upper and lower current collectors 180 and 182. The third and fourth current collector tabs 170A and 170B are horizontally spaced apart from each other and are vertically disposed at different heights. The third and fourth current collector tabs 170A and 170B may be at the same height by adjusting the number of extended portions, respectively provided in the second current collector layers 240*a* and 240*b* connected to the third and fourth current collector tabs 170A and 170B, or changing the vertical stacking method of the second current collector layers 240*a* and 240*b*.

The lower current collector 182 includes the portion 182A extending upward. The extended portion 182A covers the third and fourth current collector tabs 170A and 170B. The third current collector tab 170A may be completely covered with the extended portion 182A, and the fourth current collector tab 170B may be covered with the partially extended portion 182A. In an embodiment, the fourth current collector tab 170B may also be completely covered by the extended portion 182A. The extended portion 182A is spaced apart from the upper current collector 180.

In FIG. 1, the stack cell 120 includes two current collector tabs 150A and 150B as the current collector 150 of the first electrode, and includes two current collector tabs 170A and 170B as the current collector 170 of the second electrode.

Each of the current collectors 150 and 170 of the first and second electrodes of the stack cell 120 may include two or more current collector tabs.

FIGS. 7 to 10 illustrate examples thereof, and for convenience of illustration, only the current collector layers 7C1-7C8 are illustrated in the cell stack CS1, and the electrode layer (active material layer) and the separator are not illustrated therein. Furthermore, the cell stack CS1 is set to include eight vertically stacked current collector layers 7C1-7C8, that is, the cell stack CS1 is set to include eight unit cells. The following description may be applied when eight or less or eight or more current collector layers are included.

The eight current collector layers 7C1-7C8 may be in contact with the first electrode layer 230 of the unit cell 2C1, or may be in contact with the second electrode layer 240 of the unit cell 2C1.

FIGS. 7 to 10 show front views of a side surface on which the current collector 150 of the first electrode of the stack cell 120 of FIG. 1 is disposed.

Figure 7:
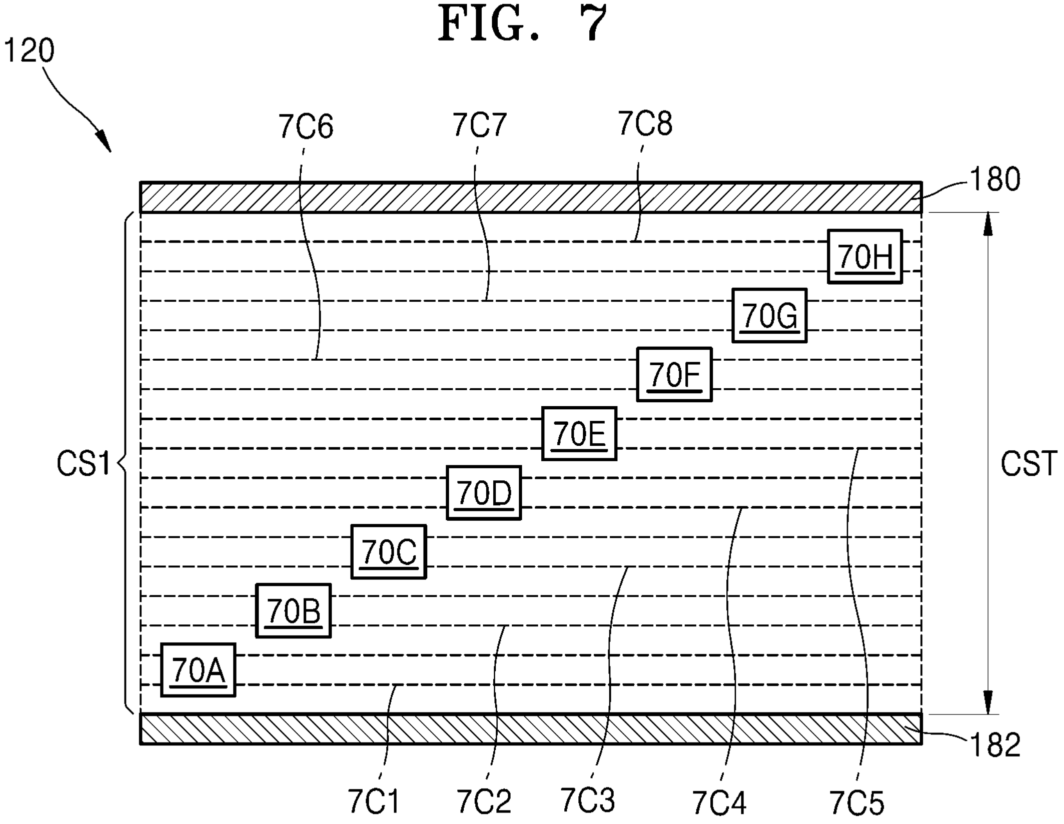
FIG. 7 is a front view showing an embodiment in which current collectors of first and second electrodes of the stack cell of the coin-type cell of FIG. 1 include eight current collector tabs.

As shown in FIG. 7, the first to eighth current collector tabs 70A to 70H may be disposed between the upper and lower current collectors 180 and 182 of the cell stack CS1. The first to eighth current collector tabs 70A to 70H may be spaced apart from each other in a horizontal direction, and may be vertically at different heights. The first to eighth current collector tabs 70A to 70H are disposed to be sequentially increased from the lower left end to the upper right end of the cell stack CS1, but are not limited to this arrangement. Each of the first to eighth current collector tabs 70A to 70H may be regarded as a primary current collector. The first to eighth current collector tabs 70A to 70H may correspond to first to eighth current collector layers 7C1 to 7C8 on a one-to-one basis. That is, one current collector tab may correspond to one current collector layer.

Current may flow from the cell stack CS1 to the upper and lower current collectors 180 and 182 through eight paths, and electrical resistance may be lower than when current flows through one path. In other words, electrical conductivity may be increased.

In FIG. 7, the reference character CST indicates the thickness of the cell stack CS1.

Figure 8:
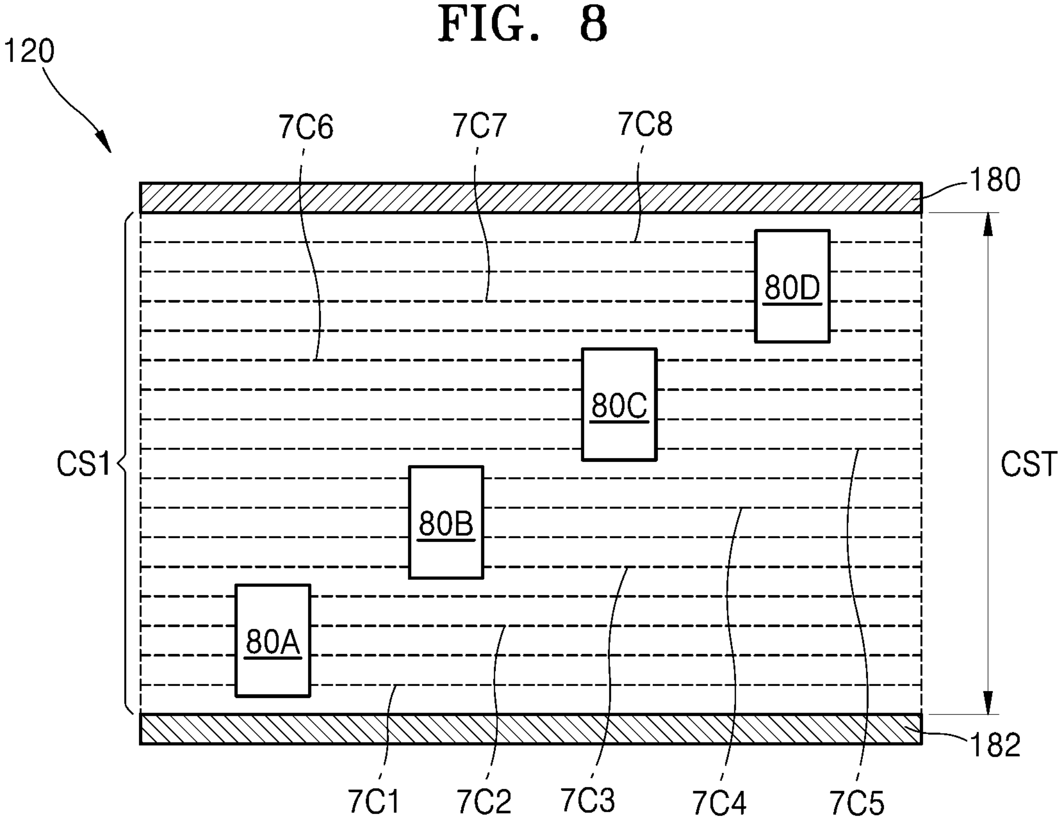
FIG. 8 is a front view showing an embodiment in which current collectors of first and second electrodes of the stack cell of the coin-type cell of FIG. 1 include four current collector tabs.

As shown in FIG. 8, four current collector tabs 80A to 80D may be disposed between the upper and lower current collectors 180 and 182. Each of the current collector tabs 80A to 80D corresponds to two current collector layers. For example, extended portions of the first and second current collector layers 7C1 and 7C2 may be combined to form the first current collector tab 80A. The first to fourth current collector tabs 80A to 80D may be regarded as the primary current collector. The first to fourth current collector tabs 80A to 80D are horizontally spaced apart from each other, and are disposed vertically at different heights.

Referring to FIG. 8, which is similar to that of FIG. 7, current generated in the cell stack (CS1) may flow to the secondary current collectors 180 and 182 through four paths, and electrical conductivity may be increased compared to when current flows through one path.

Figure 9:
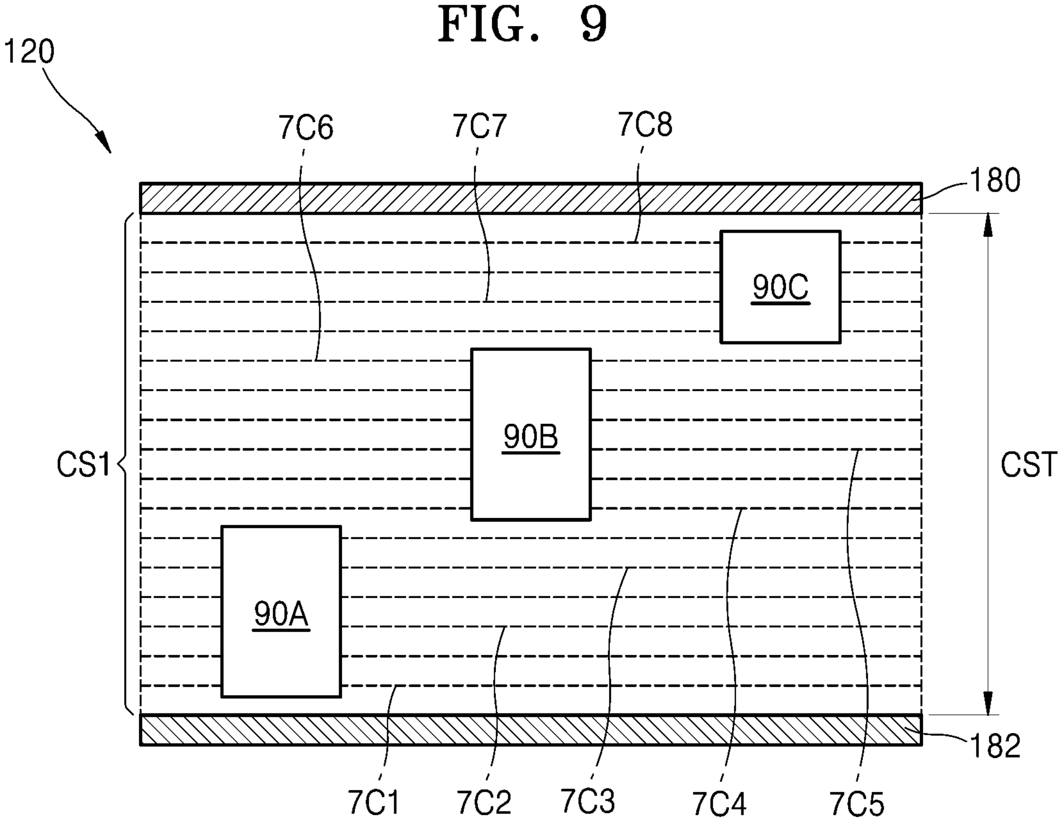
FIG. 9 is a front view showing an embodiment in which current collectors of first and second electrodes of the stack cell of the coin-type cell of FIG. 1 include three current collector tabs.

FIG. 9 illustrates an embodiment in which three current collector tabs 90A to 90C are disposed in the cell stack CS1.

Referring to FIG. 9, the first current collector tab 90A corresponds to the first to third current collector layers 7C1-7C3, the second current collector tab 90B corresponds to the fourth to sixth current collector layers 7C4-7C6, and the third current collector tab 90C corresponds to the seventh and eighth current collector layers 7C7-7C8. Here, "correspondence" may mean a contact or direct connection. The first to third current collector tabs 90A to 90C are horizontally spaced apart from each other and vertically disposed at different heights. Current generated in the cell stack CS1 may flow to the upper and lower current collectors 180 and 18), which are the secondary current collectors, through the three paths 90A to 90C, and electrical conductivity may be higher than when a current flows through one path.

Figure 10:
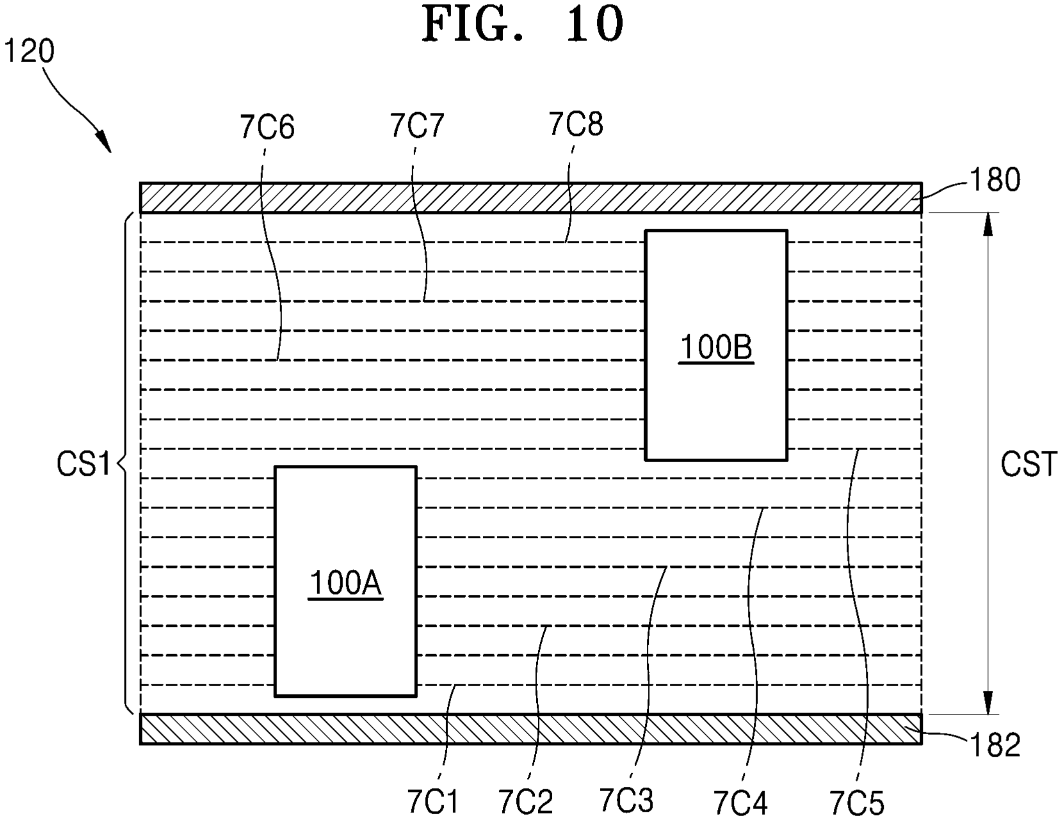
FIG. 10 is a front view showing an embodiment in which current collectors of first and second electrodes of the stack cell of the coin-type cell of FIG. 1 include two current collector tabs.

FIG. 10 illustrates an embodiment in which two current collector tabs 100A and 100B correspond to eight current collector layers 7C1 to 7C8 contained in the cell stack CS1.

Referring to FIG. 10, the first current collector tab 100A is disposed to correspond to the first to fourth current collector layers 7C1 to 7C4, and the second current collector tab 100B is disposed to correspond to the fifth to eighth current collector layers 7C5 to 7C8. The arrangement forms of the first and second current collector tabs 100A and 100B may correspond to the first and second current collector tabs 150A and 150B of FIG. 1.

Current generated in the cell stack CS1 of FIG. 10 may flow to the upper and lower current collectors 180 and 182 through two paths 100A and 100B, and electrical conductivity may be higher than when a current flows through one path.

As shown in FIGS. 7 to 10, the number of current collector tabs related to the first electrode layer in the cell stack CS1 may be at least two or equal to the number of unit cells included in the cell stack CS1. The cell stack CS1 may include first and second electrode layers, and the total number of current collector tabs that may be included in the cell stack CS1 may be at least four or two times the number of unit cells included in the cell stack CS1. This number may be the number of primary current collectors provided between the cell stack CS1 and the secondary current collectors 180 and 182.

Figure 11:
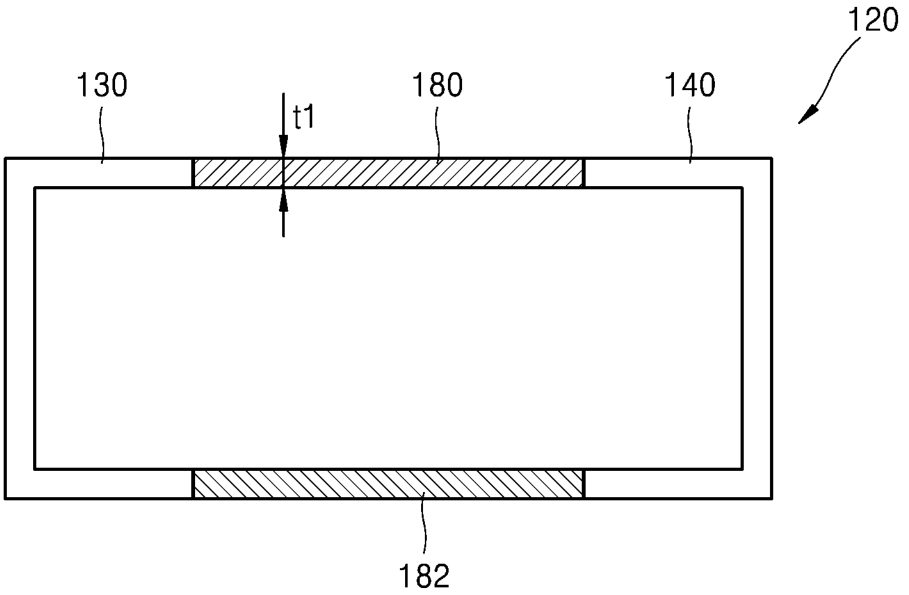
FIG. 11 is a cross-sectional view of the coin type cell of FIG. 1 taken along line 11-11'.

FIG. 11 shows a cross-section of the stack cell taken along an 11-11' direction of FIG. 1.

Referring to FIG. 11, the upper current collector 180 is present on a partial region of an upper surface of the cell stack CS1, and the lower current collector 182 is present on a partial region of a lower surface of the cell stack CS1. The upper and lower current collectors 180 and 182 may be provided to be vertically symmetrical with respect to the cell stack CS1.

Portions of the first and second jigs 130 and 140 are arranged on the upper surface of the cell stack CS1, and the first and second jigs 130 and 140 are spaced apart from each other. The thicknesses of the first and second jigs 130 and 140 may be equal to each other. The entire upper surface of the cell stack CS1 between the first and second jigs 130 and 140 is covered with the upper current collector 180. The upper current collector 180 is filled between the first and second jigs 130 and 140. The thickness t1 of the upper current collector 180 may be the same as the thicknesses of the first and second jigs 130 and 140. In an embodiment, the thickness t1 of the upper current collector 180 may not be the same as the thicknesses of the first and second jigs 130 and 140. The first and second jigs 130 and 140 and the upper current collector 180 may form the same plane on the upper surface of the cell stack CS1. In other words, the upper current collector 180 may be provided and there may not be a step between the first and second jigs 130 and 140 and the upper surface of the cell stack CS1.

When pressure is applied to the upper surface of the cell stack CS1 as a step between the first and second jigs 130 and 140 and the upper surface of the cell stack CS1 disappears, the pressure may not be concentrated on a specific region of the upper surface, but may be uniformly applied to the entire upper surface.

A step may be present between the first and second jigs 130 and 140 and the cell stack CS1, and a problem caused by applying relatively large pressure to regions corresponding to the first and second jigs 130 and 140 compared to other regions of the upper surface of the cell stack CS1 may be resolved.

Referring to FIGS. 1 and 11, an area occupied by the first and second jigs 130 and 140 on the upper surface of the cell stack CS1 is smaller than an area occupied by the upper current collector 180. Even if the thickness t1 of the upper current collector 180 is greater than the thicknesses of the first and second jigs 130 and 140 within a given range, a problem caused by concentrating the pressure applied to the upper surface of the cell stack CS1 into a narrow region may not occur.

Referring to FIG. 11, the first and second jigs 130 and 140 extend to a partial region of the bottom surface along the side surface of the cell stack CS1, and the cell stack CS1 may be in a form in which both sides of the cell stack CS) are fitted in the first and second jigs 130 and 140. The first and second jigs 130 and 140 may cover the side surfaces of the cell stack CS1 and may be in direct contact with the side surfaces. The first and second jigs 130 and 140 are spaced apart from each other on the bottom surface of the cell stack CS1. A space between the first and second jigs 130 and 140 on the bottom surface of the cell stack CS1 is filled with the lower current collector 182. The thickness of the lower current collector 182 may be the same as that of the upper current collector 180. The thickness of the lower current collector 182 may be the same as the thicknesses of the first and second jigs 130 and 140. In an embodiment, the thickness of the lower current collector 182 may not be the same as the thicknesses of the first and second jigs 130 and 140. Accordingly, the first and second jigs 130 and 140 and the lower current collector 182 may be coplanar on the bottom surface of the cell stack CS1. Accordingly, like, e.g., similar to, the upper surface of the cell stack CS1, the pressure applied to the lower surface of the cell stack CS1 may not be concentrated on a narrow specific region of the lower surface, and may be uniformly transmitted to the entire lower surface.

Figure 12:
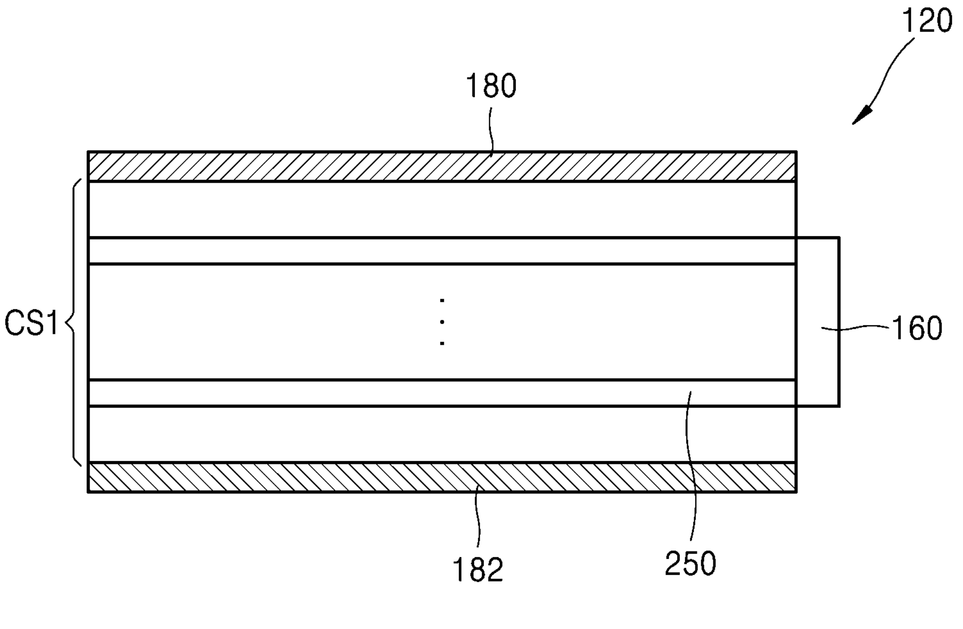
FIG. 12 is a cross-sectional view of the coin-type cell of FIG. 1 taken along line 12-12'.

FIG. 12 shows a cross-section illustrating FIG. 1 cut in a 12-12' direction.

Referring to FIG. 12, the entire upper surface of the cell stack CS1 is covered with the upper current collector 180, and the entire lower surface thereof is covered with the lower current collector 182. In an embodiment, the upper current collector 180 is a single layer flat current collector and may be a plate with conductivity (hereinafter, referred to as a conductive plate), but is not limited thereto. In an embodiment, the lower current collector 182 is a single-layer flat current collector and may be a conductive plate, but is not limited thereto. A separator position tab 160 exists on the right surface of the cell stack CS1 as shown in FIG.

12. The separator position tab 160 is connected to the separators 250 included in the cell stack CS1. Each of the separators 250 included in the cell stack CS1 may have a laterally extending portion (protruding portion). The separator position tab 160 may be a result of combining the extended portions of each of the separators 250.

Figure 13:
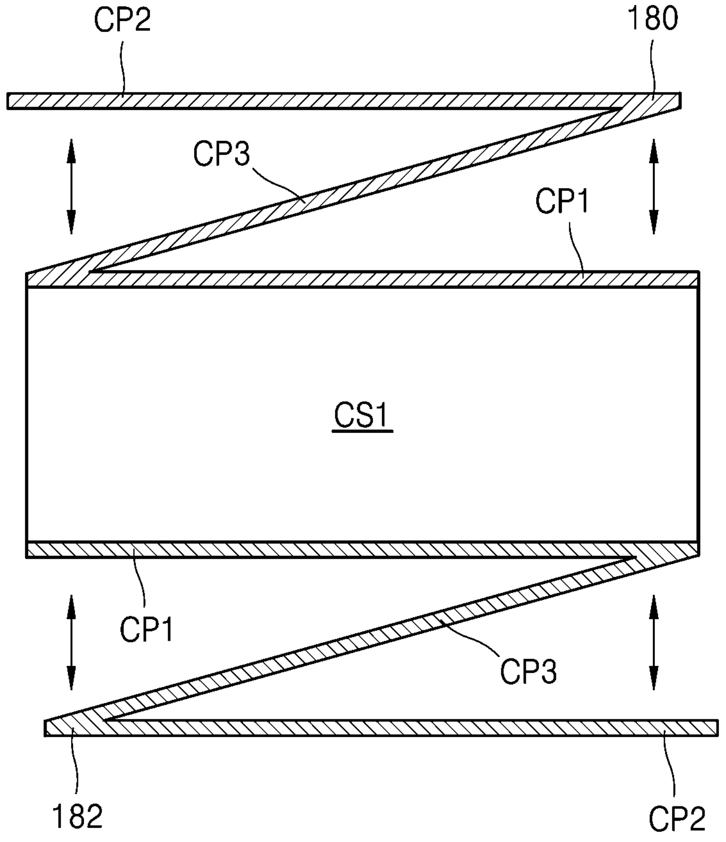
FIG. 13 is a cross-sectional view of an embodiment in which the secondary current collector shown in FIG. 12 being a foldable elastic body.

In an embodiment, the upper and lower current collectors 180 and 182 may not be a single layer. For example, as shown in FIG. 13, the upper and lower current collectors 180 and 182 may include a plurality of conductive plates (e.g., metal plates) having an alphabetical Z-shape cross-section and elasticity, but are not limited to the alphabetical Z-shape. The upper and lower current collectors 180 and 182 may be unfolded or folded in a direction perpendicular to the upper and lower surfaces of the cell stack CS1. That is, the upper and lower current collectors 180 and 182 may be foldable type elastic bodies.

The upper and lower current collectors 180 and 182 may include a first horizontal portion CP1, which is a conductive plate contacting the cell stack CS1, and a second horizontal portion CP2, which is a conductive plate contacting the inside of the lid or cover of the case 190 of the cell coin type cell 100, and an inclined portion CP3 connecting the first and second horizontal portions CP1 and CP2. The first horizontal portion CP1 may include a portion electrically bonded to the current collector 150 of the first electrode of the cell stack CS1.

In an embodiment, a portion of the first horizontal portion CP1 bonded to the current collector 150 of the first electrode may be split by the number of side surfaces provided with the current collector tap belonging to the current collector tab 150 of the first electrode of the stack cell CS1 and may be bonded, on a one-to-one basis, to the current collector tab provided on each side. For example, as similar to FIG. 21, two current collector tabs 1350A and 1350B included in a current collector 1350 of the first electrode may be provided on two surfaces in different directions, and a portion of the first horizontal portion CP1 bonded to the current collector 1350 of the first electrode may be split into two surfaces corresponding to the two surfaces and may be bonded, on a one-to-one basis, to the two current collector tabs 1350A and 1350B. This arrangement may be equally applicable to the bonding of the first horizontal portion CP1 of the lower current collector 182 and the current collector 170 of the second electrode.

In an embodiment, two current collector tabs may be provided on one side surface of the stack cell CS1, and a portion corresponding to the one side surface of the first horizontal portion CP1 may be bonded to both the two current collector tabs, and may be split into two so as to be bonded to the two current collector tabs on a one-to-one basis. The first and second horizontal portions CP1 and CP2 and the inclined portion CP3 may include the same material and may include a contiguous body or continuous single body.

Figure 14:
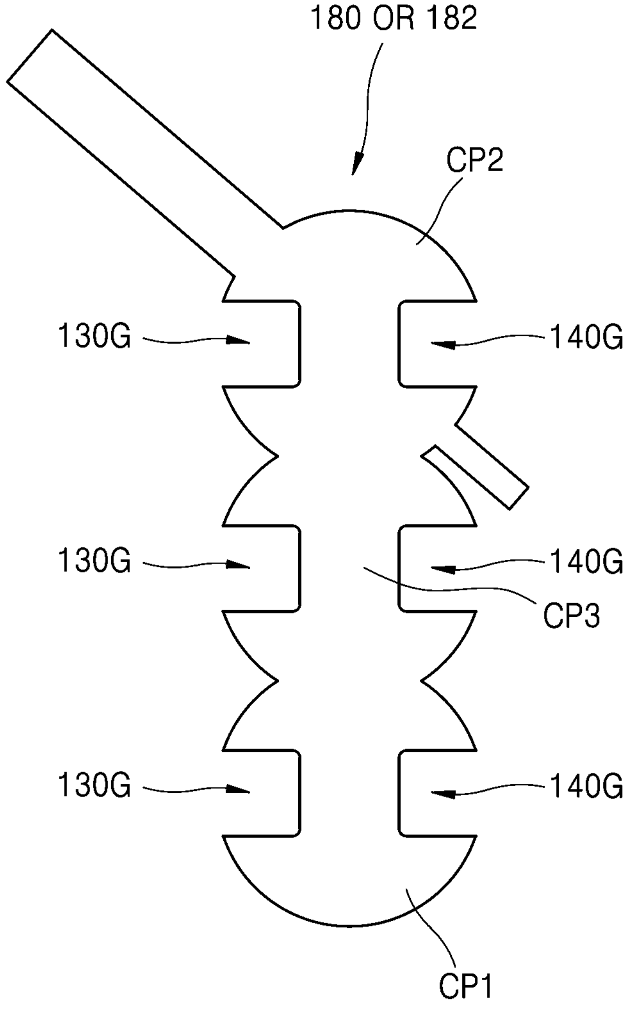
FIG. 14 is a plan view illustrating an embodiment of a foldable elastic secondary current collector shown in FIG. 13.

FIG. 14 is a view of an unfolded state of the upper and lower current collectors 180 and 182 including the first and second horizontal portions CP1 and CP2 and the inclined portions CP3 of FIG. 13.

Referring to FIG. 14, the first horizontal portion CP1, the second horizontal portion CP2, and the inclined portion CP3 all have first and second grooves 130G and 140G for accommodating the first and second jigs 130 and 140.

Figure 15:
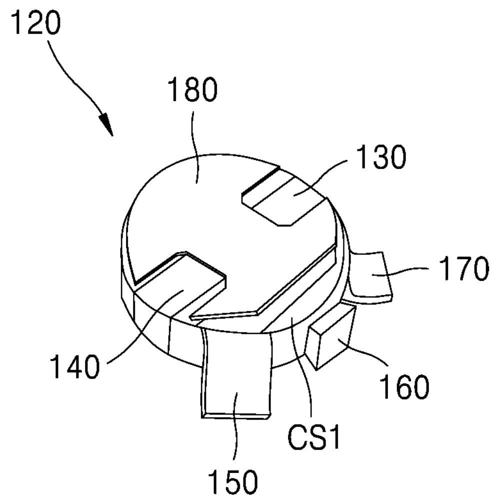
FIG. 15 is a three-dimensional view of an embodiment of a stack cell of a coin-type cell.

FIG. 15 is a three-dimensional view showing a stack cell 120 provided with the upper and lower current collectors 180 and 182 and the first and second jigs 130 and 140 illustrated in FIGS. 13 and 14.

Figure 16:
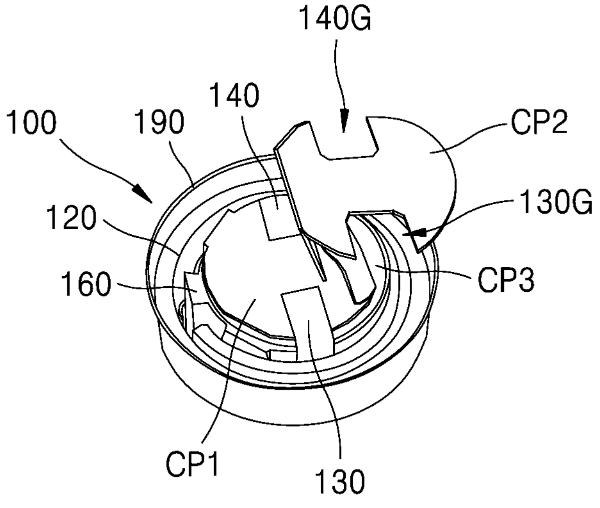
FIG. 16 is a three-dimensional view of an embodiment in which the stack cell of FIG. 15 is mounted on a battery case.

FIG. 16 is a three-dimensional illustrating a coin type cell 100 of FIG. 1 in which the stack cell 120 to which the upper and lower current collectors 180 and 182 of FIG. 14 are applied is mounted in the case 190. The coin type cell 100 of FIG. 16 is in a state in which the lid (cover) is removed to show the inside of the coin type cell 100 of FIG. 1.

An electrolyte or an electrolytic solution is supplied to the stack cell 120 before the stack cell 120 is filled in the case 190, and except for the current collectors 150 and 170 of the first and second electrodes, the side surface of the stack cell 120 supplied with the electrolyte may be sealed and the electrolyte may not leak.

Figure 17:
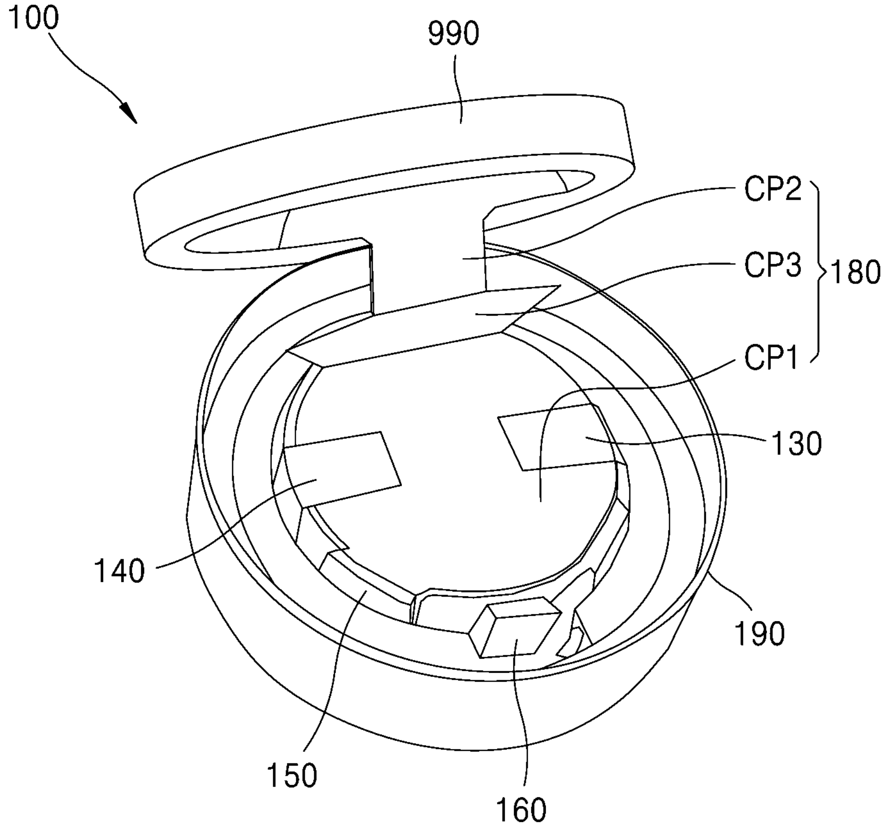
FIG. 17 is a three-dimensional view of a battery case and a lid (cover) together in the battery case shown in FIG. 16.

FIG. 17 is a three-dimensional view of a coin type cell 100 of FIG. 1 including the cell 100 of FIG. 16 and a lid 990.

Referring to FIG. 17, the second horizontal portion CP2 of the upper current collector 180 is connected (bonded) to the inside of the lid 990.

In a coin type cell 100 of FIG. 1, the first current collector layer 230*a* included in the first electrode layer 230 and the second current collector layer 240*a* included in the second electrode layer 240 may be provided to be exposed only in one side surface, may be provided to be exposed in two side surfaces, or may be provided to be exposed in three side surfaces. The coin type cell 100 of FIG. 1 may be designed such that side surfaces of the first and second current collector layers 230*a* and 240*a* are exposed on three or more surfaces. Here, the term "exposed" may mean exposure of a portion of the side surface. For example, the expression such as the "exposure of one side surface" may mean that a portion of one side surface is exposed.

Figure 18A:
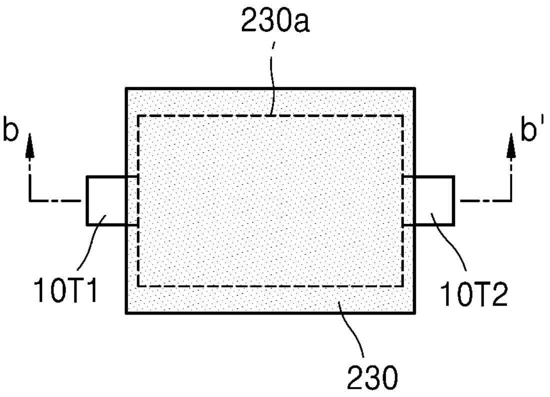
FIG. 18A is a plan view illustrating the number and directions of side surfaces exposed to the first and second current collector layers of the unit cell in the stack cell of the coin-type cell of FIG. 1.
Figure 18B:
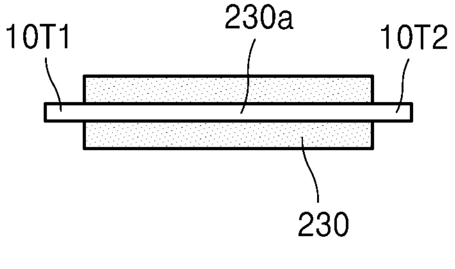
FIG. 18B is a cross-sectional view illustrating the number and directions of side surfaces exposed to the first and second current collector layers of the unit cell in the stack cell of the coin-type cell of FIG. 1.
Figure 19A:
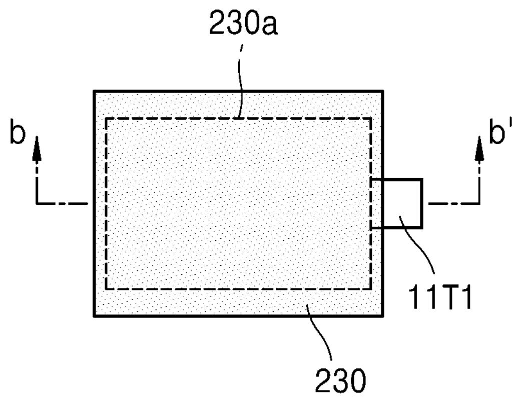
FIG. 19A is a plan view illustrating the number and directions of side surfaces exposed to the first and second current collector layers of the unit cell in the stack cell of the coin-type cell of FIG. 1.
Figure 19B:
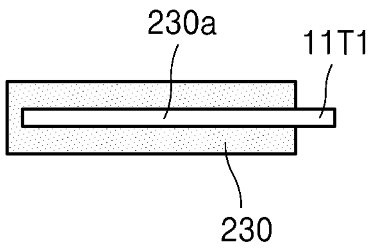
FIG. 19B is a cross-sectional view illustrating the number and directions of side surfaces exposed to the first and second current collector layers of the unit cell in the stack cell of the coin-type cell of FIG. 1.
Figure 20A:
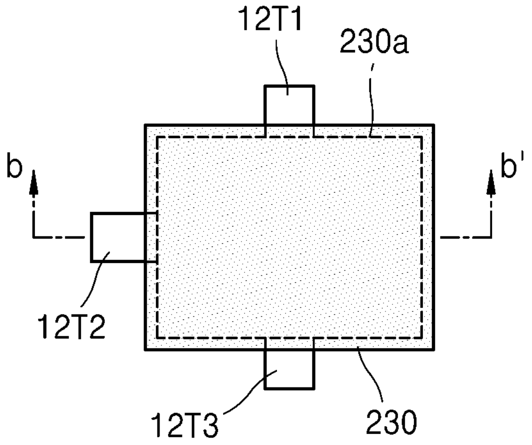
FIG. 20A is a plan view illustrating the number and directions of side surfaces exposed to the first and second current collector layers of the unit cell in the stack cell of the coin-type cell of FIG. 1.
Figure 20B:
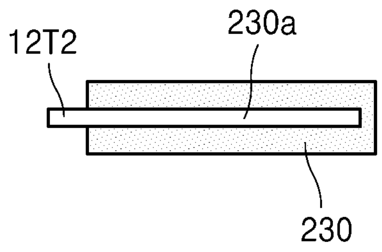
FIG. 20B is a cross-sectional view illustrating the number and directions of side surfaces exposed to the first and second current collector layers of the unit cell in the stack cell of the coin-type cell of FIG. 1.

FIGS. 18 to 20 show an embodiment of "exposure". Each of FIGS. 18A, 19A, and 20A is a plan view of the first electrode layer 230 including the first current collector layer 230*a*, and FIGS. 18B, 19B, and 20B show a cross section of the first electrode layer 230 of FIGS. 18A, 19A, and 20A taken along a direction b-b'.

In FIGS. 18 to 20, plane shapes of the first electrode layer 230 and the first current collector layer 230*a* are illustrated in a rectangular shape for convenience of illustration, but are not limited thereto, and may be a circular shape, a non-circular shape, a polygonal shape, or the like. The polygon may include a triangle, a pentagon, a hexagon, an octagon, and the like, but is not limited thereto.

FIG. 18 shows an embodiment in which the first current collector layer 230*a* is provided on the first electrode layer 230 and only both side surfaces of the first current collector layer 230*a* may be exposed.

Referring to FIGS. 18A and 18B, the first current collector layer 230*a* is provided in the first electrode layer 230 and only the left and right side surfaces may be exposed and the remaining side surfaces may not be exposed. That is, the first current collector layer 230*a* has a first portion (tab) 10T1 extending in the left direction and a second portion (tab) 10T2 extending in the right direction.

FIG. 19 shows an embodiment in which the first current collector layer 230*a* is provided on the first electrode layer 230 and only one side surface of the first current collector layer 230*a* may be exposed.

Referring to FIGS. 19A and 19B, the first current collector layer 230*a* is provided in the first electrode layer 230 and only the right side surface is exposed and the remaining side surfaces may not be exposed. That is, the first current collector layer 230*a* has a portion (tab) 11 T1 extending only to the right.

FIG. 20 shows an embodiment in which the first current collector layer 230*a* is provided on the first electrode layer 230 and only three side surfaces of the first current collector layer 230*a* may be exposed.

Referring to FIGS. 20A and 20B, the first current collector layer 230*a* is provided in the first electrode layer 230 and only the front, left, and rear side surfaces may be exposed and the right side surface may not be exposed. The first current collector layer 230*a* has a first portion (tab) 12T1 extended to the front, a second portion (tab) 12T2 extended to the left, and a third portion (tab) 12T3 extended to the rear, and does not have an extended portion to the right.

Figure 21:
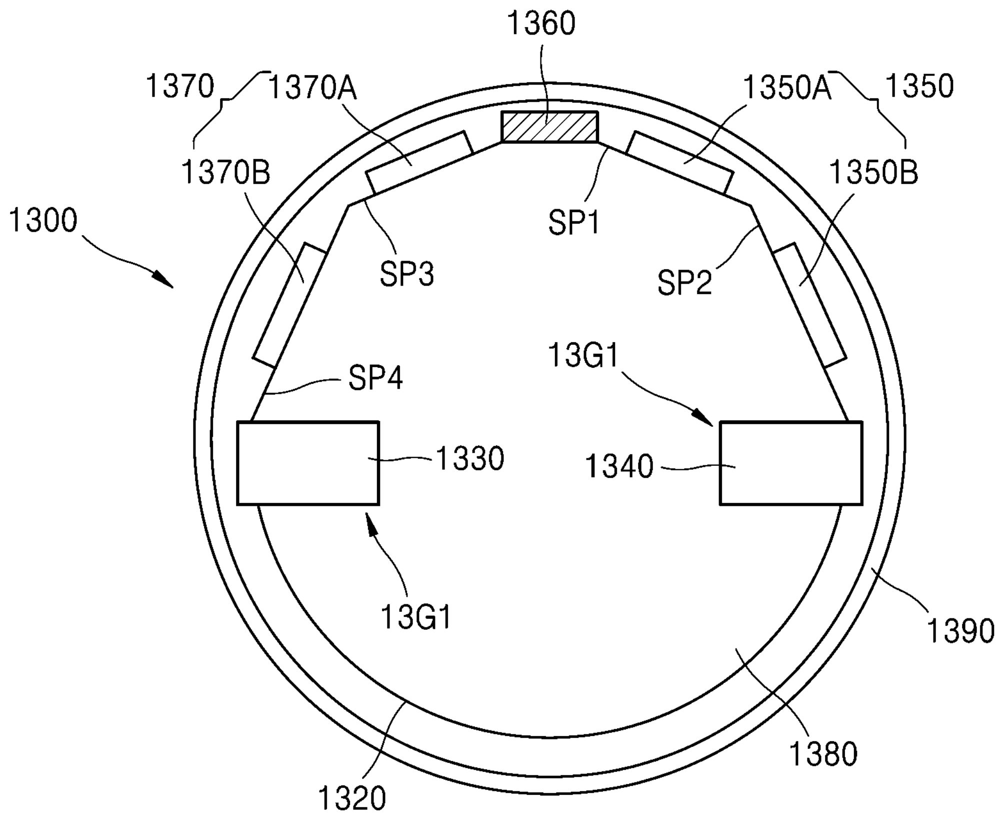
FIG. 21 is a plan view of an embodiment of a coin-type cell.

FIG. 21 illustrates a planar shape of a coin type cell 1300 including a plurality of stacked cells according to an embodiment. Only portions of FIG. 21 different from portions of the coin type cell 100 of FIG. 1 will be described.

Referring to FIG. 21, the coin type cell 1300 includes a stack cell 1320 inside a case 1390, and includes insulating first and second jigs 1330 and 1340 fixing both sides of the stack cell 1320. The first and second jigs 1330 and 1340 may be provided to correspond to the first and second jigs 130 and 140 of the coin type cell 100 of FIG. 1. The shape of the stack cell 1320 may be similar to the stack cell 120 of the coin type cell 100 of FIG. 1. The stack cell 1320 includes straight line sections SP1 to SP4 in four places, which is more than the stack cell 120 of the coin type cell 100 of FIG. 1. The four straight line sections SP1 to SP4 represent four flat side surfaces of the stack cell 1320. Two of the four straight line sections SP1 to SP4 are respectively provided in left and right sides with respect to the separator position tab 1360. The separator position tab 1360 may be provided to correspond to the separator position tab 160 of the coin type cell 100 of FIG. 1. A first current collector tab 1350A is arranged between the first straight line section SP1 on the right side of the separator position tab 1360 and the case 1390. The first current collector tab 1350A is in contact with the stack cell 1320 and is spaced apart from the case 1390. The first current collector tab 1350A may correspond to the first current collector tab 150A of the coin type cell 100 of FIG. 1. A second current collector tab 1350B is arranged between the second straight line section SP2 and the case 1390. The second current collector tab 1350B is in contact with the stack cell 1320 and is spaced apart from the case 1390. The second current collector tab 1350B may correspond to the second current collector tab 150B of the coin type cell 100 of FIG. 1.

A third current collector tab 1370A exists between the third straight line section SP3 and the case 1390 to the left of the separator position tab 1360. The third current collector tab 1370A is in contact with the stack cell 1320 and is spaced apart from the case 1390. A fourth current collector tab 1370B exists between the fourth straight line section SP4 and the case 1390. The fourth current collector tab 1370B is in contact with the stack cell 1320 and is spaced apart from the case 1390. The third current collector tab 1370A may correspond to the third current collector tab 170A of the coin type cell 100 of FIG. 1. The fourth current collector tab 1370B may correspond to the fourth current collector tab 170B of the coin type cell 100 of FIG. 1.

With reference to the coin type cell 100 of FIG. 1, two current collector tabs 150A and 150B are arranged in parallel on one flat side surface of the stack cell 120. In the stack cell 1320 of the coin type cell 1300 of FIG. 21, there are more flat side surfaces present than in the stack cell 120 of first coin type cell 100 of FIG. 1, and one current collector tab 1350A, 1350B, 1370A, or 1370B is present for each flat side surface, as shown in FIG. 21. A side surface of the current collector layer of the unit cell is exposed through a flat side surface of the stack cell 1320. In other words, the extended portion (tab) of the current collector layer of the unit cell protrudes through the flat side surface of the stack cell 1320.

Figure 22:
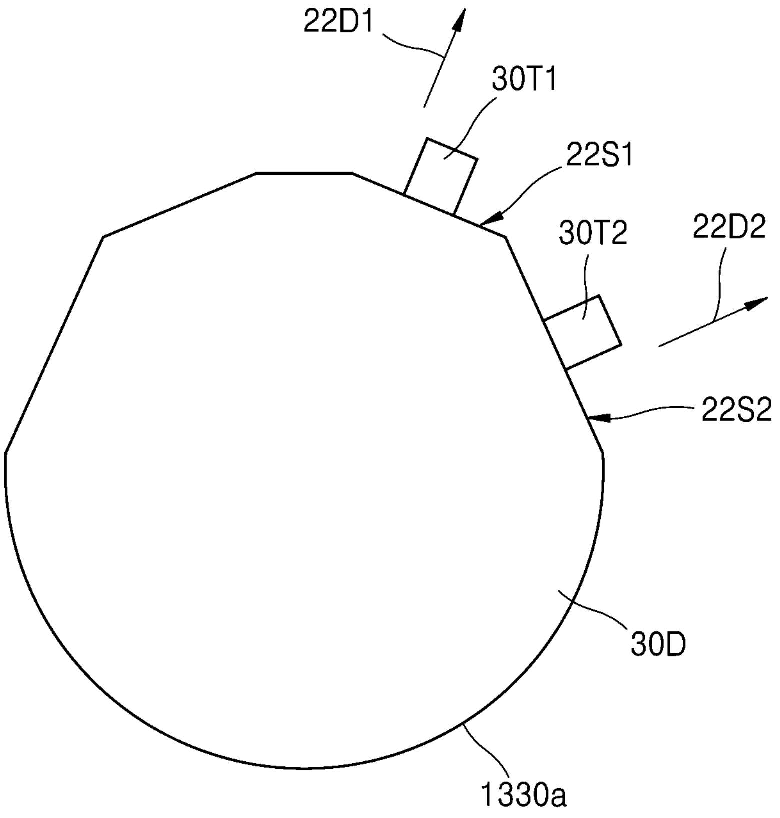
FIG. 22 is a plan view of a first current collector layer of a unit cell included in a stack cell of the coin-type cell of FIG. 21.

For example, FIG. 22 is a plan view of a first current collector layer 1330*a* having a first electrode layer of a unit cell included in the stack cell 1320 of the coin type cell 1300 of FIG. 21, in which the first electrode layer is coated on the first current collector layer 1330*a*. The first current collector layer 1330*a* includes flat first and second side surfaces 22S1 and 22S2 corresponding to the first and second straight line sections SP1 and SP2. The first side surface 22S1 faces a first direction 22D1 perpendicular to the first side surface 22S1, and the second side surface 22S2 faces a second direction 22D2 perpendicular to the second side surface 22S2. The second direction 22D2 is different from the first direction 22D1. The angle between the first direction 22D1 and the second direction 22D2 may be an acute angle greater than 0° and less than 90°. The first current collector layer 1330*a* includes a first tab 30T1 extended in the first direction 22D1 perpendicular to or substantially perpendicular to the first side surface 22S1 and a second tab 30T2 extended in the second direction 22D2 perpendicular to or substantially perpendicular to the second side surface 22S2. The remaining portion 30D excluding the first and second tabs 30T1 and 30T2 of the first current collector layer 1330A may be expressed, e.g., described, as a body or a main body. That is, the first current collector layer 1330*a* may be represented as including the body 30D and two tabs 30T1 and 30T2 extending from the body in different directions from each other. It may be seen that the two tabs 30T1 and 30T2 are extended, e.g., extend, from the body 30D by a length given in the first and second directions 22D1 and 22D2. Accordingly, there may be no physical boundary between the body 30D and the first and second tabs 30T1 and 30T2. That is, the body 30D and the first and second tabs 30T1 and 30T2 may be a contiguous body or continuous single body.

Figure 23:
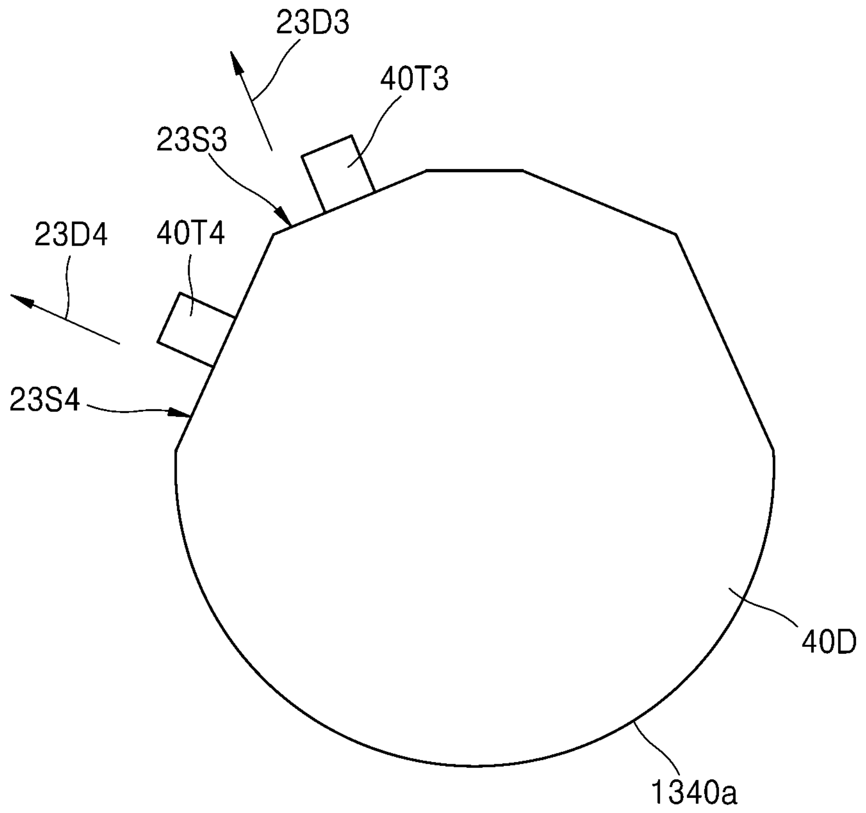
FIG. 23 is a plan view of a second current collector layer of a unit cell included in a stack cell of the coin-type cell of FIG. 21.

FIG. 23 is a plan view of a second current collector layer 1340*a* having a second electrode layer of a unit cell included in the stack cell 1320 of the coin type cell 1300 of FIG. 21, in which the second electrode layer is coated on the second current collector layer 1340*a*.

Referring to FIG. 23, the second current collector layer 1340*a* includes straight line portions corresponding to the third and fourth straight line sections SP3 and SP4 of the stack cell 1320, that is, flat third and fourth side surfaces 23S3 and 23S2. The third side surface 23S3 faces a third direction 23D3 perpendicular to or substantially perpendicular to the third side surface 23S3, and the fourth side surface 23S4 faces a fourth direction 23D4 different from the third direction 23D3. The fourth direction 23D4 may be a direction perpendicular to or substantially perpendicular to the fourth side surface 23S4. The angle between the third and fourth directions 23D3 and 23D4 may be an acute angle greater than 0° and less than 90°. In an embodiment, at least one of the third and fourth directions 23D3 and 23D4 may form an acute angle, a right angle, or an obtuse angle with one of the first and second directions 22D1 and 22D2 of FIG. 22. For example, the first direction 22D1 may form an acute angle with the third direction 23D3 and may form a right angle with the fourth direction 23D4, and the second direction 22D2 may form an acute angle or a right angle with the third direction 23D3, and may form an obtuse angle with the fourth direction 23D4.

The second current collector layer 1340*a* includes a third tab 40T3 extending in the third direction 23D3 and a fourth tab 40T4 extending in the fourth direction 23D4. The lengths of the third and fourth tabs 40T3 and 40T4 may be the same or different from each other. In the stack cell 1320, the third and fourth tabs 40T3 and 40T4 are exposed (protruded) through the side surfaces of the third and fourth straight line sections SP3 and SP4.

The first to fourth tabs 22T1, 22T2, 23T3, and 23T4 may extend in the same directions as the first to fourth directions 22D1, 22D2, 23D3, and 23D4, respectively, and the description related to the angles between the first to fourth directions 22D1, 22D2, 23D3, and 23D4 may be equally applicable to the angles between the first to fourth tabs 22T1, 22T2, 23T3, and 23T4.

The remaining portion 40D excluding the third and fourth tabs 40T3 and 40T4 of the second current collector layer 1340*a* may be expressed, e.g., described, as a body or a main body. Accordingly, the second current collector layer 1340*a* may be expressed, e.g., described, as including the body 40D and two tabs 40T3 and 40T4 extending from the body in different directions from each other. It may be seen that the two tabs 40T3 and 40T4 are extended, e.g., extend, from the body 40D by a length given in the third and fourth directions 23D3 and 23D4. Accordingly, there may be no physical boundary between the body 40D and the third and fourth tabs 40T3 and 40T3. In other words, the body 40D and the third and fourth tabs 40T3 and 40T4 may be a contiguous body or continuous single body.

In an embodiment, in FIG. 22, only one of the first and second tabs 30T1 and 30T2 may be provided on the first current collector layer 1330*a*, and in FIG. 23, only one of the third and fourth tabs 40T3 and 40T4 may be provided on the second current collector layer 1340*a*.

With reference to FIG. 22, in an embodiment, a plurality of first current collector layers 1330*a* may be alternately stacked such that the positions of tabs are alternately stacked. For example, in the case of a plurality of vertically stacked first current collector layers 1330*a*, the first current collector layer 1330*a* provided with only the first tab 30T1 may be used, the second first current collector layer 1330*a* provided with only the second tab 30T2 may be used, and for the rest the first and second first current collector layers 1330*a* may be alternately stacked repeatedly. In the case of a plurality of vertically stacked second current collector layers 1340*a*, the first one provided with only the third tab 40T3 may be used, the second one provided with only the fourth tab 40T4 may be used, and the rest may be alternately stacked with the first and second ones. In addition, in an embodiment, the first current collector layer 1330*a* provided with only the first tab 30T1 may be stacked from the first order to a predetermined order, the first current collector layer 1330*a* provided with only the second tab 30T2 may be stacked from the predetermined order, and the plurality of second current collector layers 1340*a* may be stacked in a similar method.

Accordingly, for example, the stack cell 1320 may include 10 unit cells, the first tab 30T1 of the first current collector layer 1330*a* of the first to fifth unit cells (or the first, third, fifth, seventh and ninth unit cells) may be exposed on a flat side surface indicated by the first straight line section SP1, and the exposed first tab 30T1 may be combined, e.g., into one, (or bonded) to become a first current collector tab 1350A. The second tab 30T2 of the first current collector layer 1330*a* of the sixth to tenth unit cells (or the second, fourth, sixth, eighth, and tenth unit cells) may be exposed on a flat side surface indicated by the second straight line section SP2, and the exposed second tab 30T2 may be combined, e.g., into one, (or bonded) to become a second current collector tab 1350B. This stacking method of the first current collector layer 1330*a* may also be applied to stacking of the second current collector layer 1340*a*.

The first current collector layer 1330*a* may include both two tabs 30T1 and 30T2, as illustrated in FIG. 22, and the second current collector layer 1340*a* may also include both two tabs 40T3 and 40T4, as illustrated in FIG. 23, and the first tab 30T1 of the first current collector layer 1330*a* of the first to tenth unit cells may be exposed on a flat side surface indicated by the first straight line section SP1, and the exposed first tab 30T1 may be combined, e.g., into one, (or bonded) to become the first current collector tab 1350A. Furthermore, the second tab 30T2 of the first current collector layer 1330*a* of the first to tenth unit cells is exposed on a flat side surface of the stack cell 1320 corresponding to the second straight line section SP2, and the exposed second tab 30T2 may be combined, e.g., into one, (or bonded) to become the second current collector tab 1350B. Furthermore, the third tab 40T3 of the second current collector layer 1340*a* of the first to tenth unit cells is exposed on a flat side surface indicated by the third straight line section SP3 of the stack cell 1320, and the exposed third tab 40T3 may be combined, e.g., into one, (or bonded) to become a third current collector tab 1370A. The fourth tab 40T4 of the second current collector layer 1340*a* of the first to tenth unit cells is exposed on a flat side surface indicated by the fourth straight line section SP4, and the exposed fourth tab 40T4 may be combined, e.g., into one, (or bonded) to become a fourth current collector tab 1370B.

Figure 24:
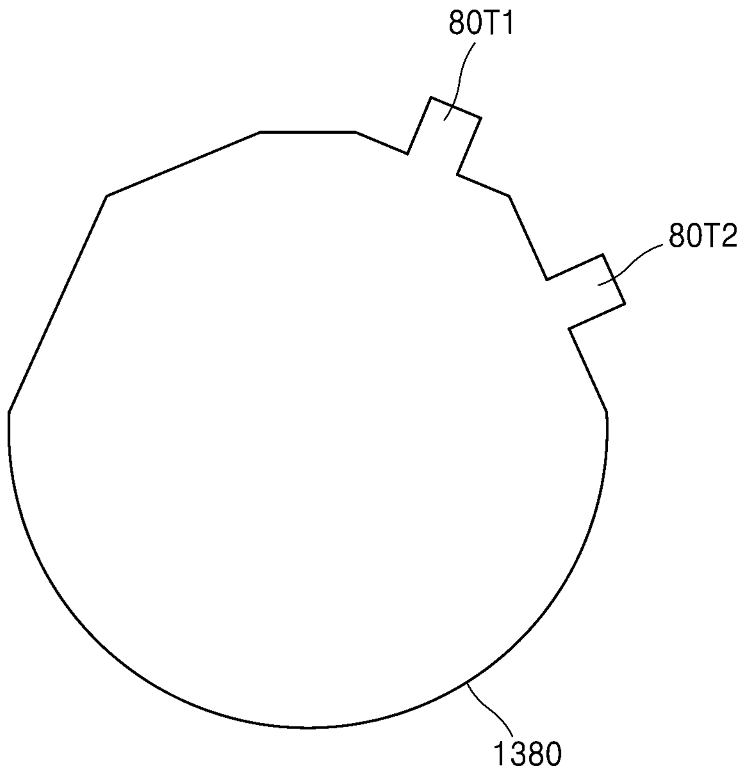
FIG. 24 is a plan view of an upper current collector included in a stack cell of the coin-type cell of FIG. 21.
Figure 25:
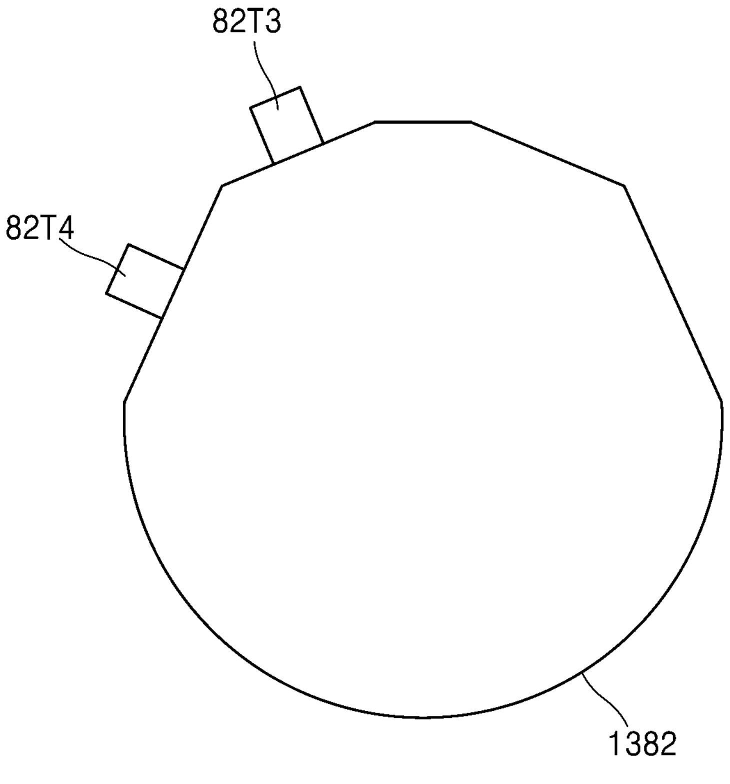
FIG. 25 is a plan view of a lower current collector included in a stack cell of the coin-type cell of FIG. 21.

A portion of the upper current collector 1380 bonded to the current collector 1350 of the first electrode may be split into first and second bonding portions 80T1 and 80T2, as shown in FIG. 24. The lower current collector 1382 facing the upper current collector 1380 and positioned at the bottom of the stack cell 1320 includes third and fourth bonding portions 82T3 and 82T4 bonded to the current collector 1370 of the second electrode, as illustrated in FIG. 25.

The first bonding portion 80T1 of the upper current collector 1380 may be bonded to the first current collector tab 1350A, and the second bonding portion 80T2 may be bonded to the second current collector tab 1350B. The third bonding portion 80T3 of the lower current collector 1382 may be bonded to the third current collector tab 1370A, and the fourth bonding portion 80T4 may be bonded to the fourth current collector tab 1370B.

A plurality of unit cells stacked vertically to the stack cell 1320 may be connected to the upper and lower current collectors 1380 and 1382 through a plurality of bonds. In other words, the plurality of unit cells included in the stack cell 1320 may be connected to the upper and lower current collectors 1380, 1382 with a plurality of paths, and the electrical resistance may be lowered. Electrical conductivity between the plurality of unit cells and the upper and lower current collectors 1380 and 1382 may be increased.

Figure 26:
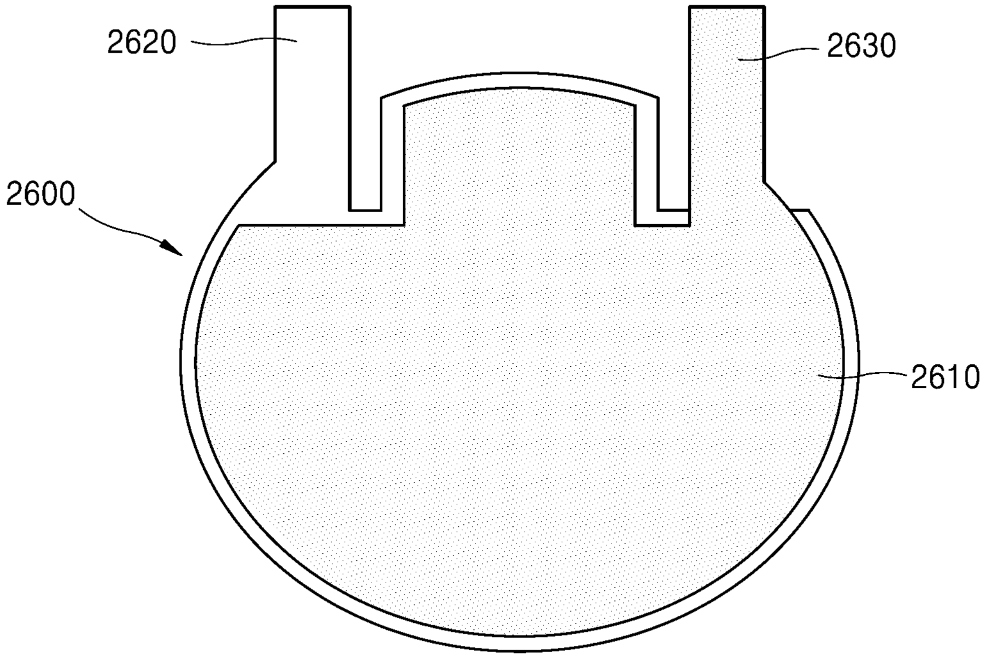
FIG. 26 is a plan view illustrating a stack cell for comparison with the coin-type cell of FIG. 1 and the coin-type cell of FIG. 21.

FIG. 26 illustrates an embodiment of a coin type cell to be compared with the coin type cell 100 of FIG. 1 and the coin type cell 1300 of FIG. 21 described above.

Referring to FIG. 26, the coin type cell 2600 includes a stack cell 2610 and two tabs 2620 and 2630 spaced apart from each other. The two tabs 2620 and 2630 are symmetrical in the left and right directions to each other. The size of the coin type cell 2600 of FIG. 26 may be the same as the sizes of the coin type cell 100 of FIG. 1 and the coin type cell 1300 of FIG. 21.

Next, Table 1 summarizes the cell characteristics of the coin type cell 100 of FIG. 1 and the coin type cell 1300 of FIG. 21 described above and the coin type cell 2600 shown in FIG. 26.

TABLE 1

| | Conventional cell of FIG. 26 | Coin type cell 100 of FIG. 1 | Coin type cell 1300 of FIG. 21 |
|---|---|---|---|
| Length (centimeters (cm)) | 9 | 6 | 6 |
| Area (square centimeters ($cm^2$)) | 0.94 | 1.12 | 1.18 |
| Retained (%) | 79.5 | 94.67 | 99.37 |
| Capacity (milliampere-hours (mAh)) | 110.5 | 131.6 | 138.2 |
| Energy density (watt-hours per liter (Wh/L)) | 498.1 | 593.1 | 622.6 |
| Increase (%) | 0 | 19.1 | 25.0 |

In Table 1, the term "length" represents the total length measured on the plane with respect to the portions cut from the coin type cell of FIG. 26 and the coin type cell 100 of FIG. 1 and the coin type cell 1300 of FIG. 21, and the term "area" represents the area of the side surface of the cut portion. The term "retained" represents the percentage of the remaining length of the stack cell after the cut relative to the length of the stack cell before the cut.

Referring to Table 1, although the coin type cell 2600 of FIG. 26 and the coin type cell 100 of FIG. 1 and the coin type cell 1300 of FIG. 21 have the same size, the capacity and energy density of the coin type cell 100 of FIG. 1 and the coin type cell 1300 of FIG. 21 are greater than that of the coin type cell 2600 of FIG. 26. The coin type cell 100 of FIG. 1 has an energy density of about 593.1 Wh/L, which is increased by about 19% in comparison with the coin type cell 2600 of FIG. 26, and the coin type cell 1300 of FIG. 21 has an energy density of about 622.6 Wh/L, which is increased by about 25% in comparison with the coin type cell 2600 of FIG. 26.

The coin type cell in accordance with the aforementioned embodiment may be a non-coin type cell, and for example, the outer shape viewed in plan views of the coin type cell 100 of FIG. 1 and the coin type cell 1300 of FIG. 21, and/or the shapes of the stack cells 120 and 1320 may be non-circular and prismatic (e.g., rectangular, etc.).

The coin type cell according to an embodiment is a secondary battery and may be applied to, e.g., used in, various devices using a battery as a power source. The device may include an electronic device.

In an embodiment, the coin type cell 100 of FIG. 1 or the coin type cell 1300 of FIG. 21 are mounted on smartphones, wearable devices (e.g., watches, bands, lighting, biosignal detectors, earphones, headsets, sound devices, or the like), AR and VR devices, Internet of Things (IoT) devices, home appliances, tablet personal computers (PCs), personal digital assistants (PDAs), portable multimedia players (PMPs), navigations, drones, robots, unmanned vehicles, autonomous vehicles, advanced driver assistance systems (ADAS), etc., but is not limited thereto.

Figure 27:
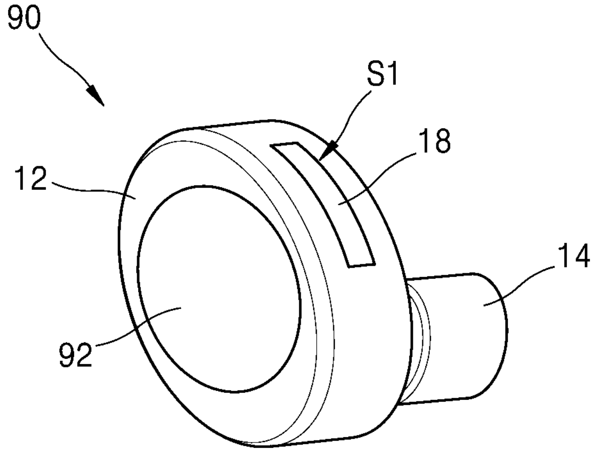
FIG. 27 is a three-dimensional view of an embodiment of a battery replaceable wireless earbud electronic apparatus including a secondary battery.

FIG. 27 shows a battery replaceable wireless earbud 90 as an embodiment an electronic apparatus including a secondary battery.

Referring to FIG. 27, the earbud 90 includes a body 12 and an insertion portion 14 connected thereto. The body 12 may include a circuit board that supports the operation of the earbud 90 and manages the battery. The insertion portion 14 has a structure protruding to a first length in a given direction from the surface of the body 12, and is a portion inserted into the ear of a wearer of the earbud 90. The first length may be determined in consideration of the depth of the wearer's ear. A slot S1 is formed in the body 12. The inlet of the slot S1 may be formed on the surface of the body 12. A battery 18 is inserted into the slot S1. The battery 18 may be a secondary battery that can be charged and used repeatedly. In an embodiment, the battery 18 may be the secondary battery described in FIGS. 1 to 26. The battery 18 may be a coin type or a prismatic secondary battery. The shape of the slot S1 may be rectangular. In an embodiment, the slot S1 may have a shape corresponding to the shape of the battery 18, that is, a shape optimized for mounting the battery 18.

Reference numeral 92 indicates a switch (operation button) that turns on and off the operation of the earbud. The switch 92 may include a touch sensor and operate in a touch manner.

The earbud 90 is a wireless earphone and may be an AirPod.

Figure 28:
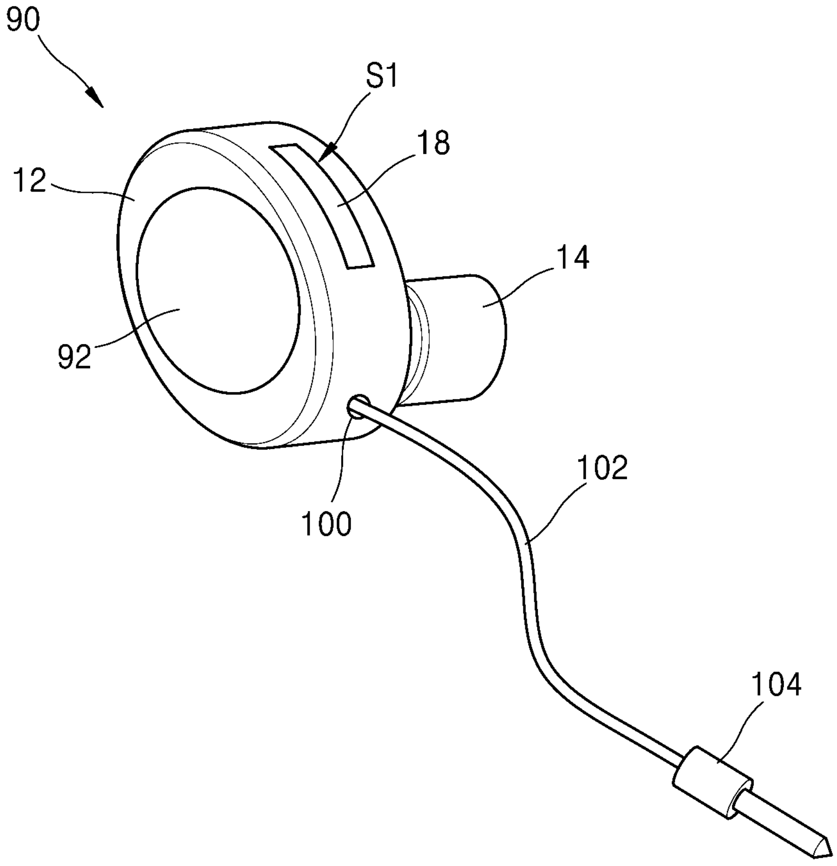
FIG. 28 is a three-dimensional view of an embodiment in which the earbud of FIG. 27 is used both in a wired and wireless manner.

In an embodiment, as illustrated in FIG. 28, the earbuds 90 may further include a connection cable 102 to be used as both a wired and wireless use. The connection cable 102 may be one of means for connecting the earbud 90 and an external device (not shown). The external device may be a device that provides voice information or voice signal to be heard through the earbud 90 and may be, for example, a mobile device, an image supply medium, a radio, or the like.

One end of the cable 102 is connected to the earbud 90. A jack 104 is attached to the other end of the cable 102. The jack 104 may be inserted into an insertion hole provided in the device. The earbud 90 has a groove 98 for connecting the cable 102 at a portion where one end of the cable 102 of the body 12 is connected. The cable 102 may be permanently connected to the body 12 through the groove 98. In an embodiment, one end of the cable 102 may be provided with a jack like, e.g., similar to, the other end and fitted into the groove 98. In the latter case, the cable 102 may be separated from the earbud 90 and the device. When the cable 102 is not desired, for example, when outdoors, the earbud 90 may be used as a wireless earbud that does not use the cable 102. When indoors, the earbuds 90 may be used in a wired manner using the cable 102, and the battery may wait, e.g., remain, in a charged state.

The above-described earbud shows only one of the paired two earbuds, for example, only a user's left earbud. The configuration of the user's right ear earbud may be the same as that of the left earbud.

Figure 29:
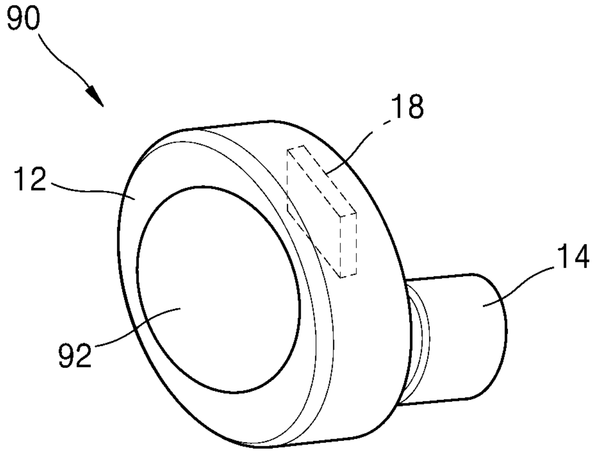
FIG. 29 is a three-dimensional view of an embodiment in which the earbud of FIG. 27 is battery-embedded without slots.

In the earbuds 90 of FIGS. 27 and 28, the slot S1 may have an optional configuration. As shown in FIG. 29, the earbud 90 may not include the slot S1, and the battery 18 may be embedded in the body 12.

Figure 30:
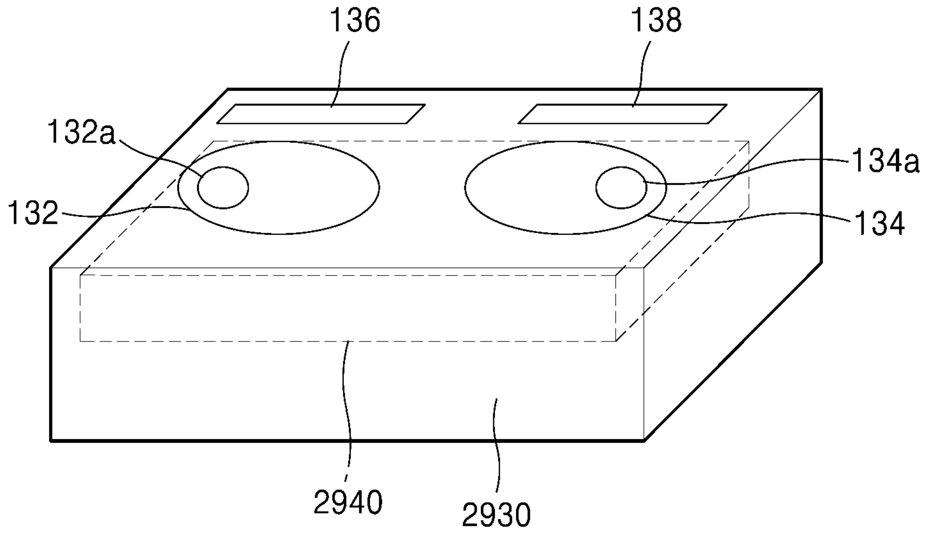
FIG. 30 is a three-dimensional view of a case for storing and charging battery replaceable earbuds.

FIG. 30 illustrates a case for storing and charging the above-described battery replaceable earbuds.

Referring to FIG. 30, first and second grooves 132 and 134 are formed on the upper surface of the case 2930. Earbuds are mounted on the first and second grooves 132 and 134, respectively. A third groove 132*a* deeper than the first groove 132 is formed in the first groove 132. A fourth groove 134*a* deeper than the second groove 134 is formed in the second groove 134. The third and fourth grooves 132*a* and 134*a* may be grooves into which the insertion portions 14 of the earbuds are respectively inserted. The third and fourth grooves 132*a* and 134*a* may be through holes. First and second slots 136 and 138 are formed on the upper surface of the case 2930. The first and second slots 136 and 138 may be arranged adjacent to each other corresponding to the first and second grooves 132 and 134, respectively. The first and second slots 136 and 138 are slots for charging batteries, respectively. While the earbuds are stored in the first and second grooves 132 and 134, the batteries may be inserted into the first and second slots 136 and 138 to be charged. A large-capacity power supply source 2940 is disposed inside the case 2930. The batteries inserted into the first and second slots 136 and 138 may be charged from the large-capacity power supply source 2940. The large-capacity power supply source 2940 may be, for example, a large-capacity battery.

Figure 31:
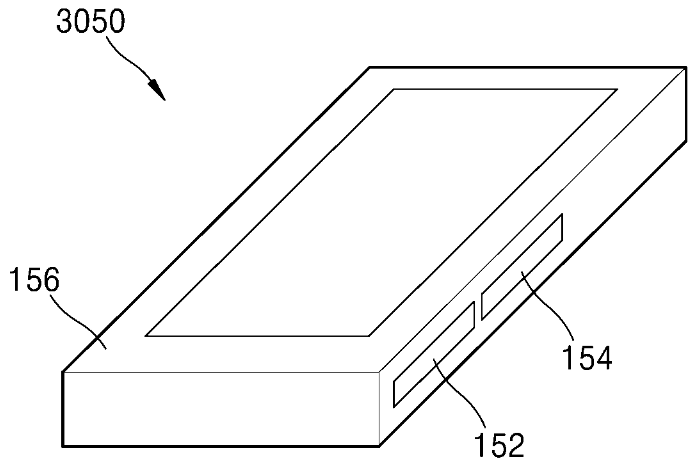
FIG. 31 is a three-dimensional view of a mobile device dedicated to the earbud shown in FIG. 27.

FIG. 31 illustrates a mobile device dedicated to the earbuds shown in FIG. 27.

Referring to FIG. 31, the mobile device 3050 exclusively for earbuds may be a mobile device optimized for earbuds. The mobile device 3050 may be a mobile phone or another portable image providing device. The mobile device 3050 includes a body 156 having at least a terminal for outputting a voice signal (voice information) and/or an image signal (image information) and first and second slots 152 and 154 on a side surface of the body 156. The first and second slots 152 and 154 may be slots for charging the replacement batteries of the earbuds. The charging power of the batteries may be supplied from the power source of the mobile device 3050.

The provided secondary battery comprises a primary current collector connected to a cell stack including a plurality of stacked unit cells, and a secondary current collector connected to the outside of the secondary battery. The primary current collector is provided to have a plurality of bonds so as to have a plurality of current paths between the positive electrode side of the cell stack and the secondary current collector and between the negative electrode side of the cell stack and the secondary current collector. Accordingly, electrical resistance between the cell stack and the secondary current collector is lowered, and electrical conductivity between the cell stack and the secondary current collector may be increased.

In addition, the secondary current collectors provided at an upper portion and a lower portion of the cell stack have a groove capable of accommodating fixing jigs provided at an upper portion and a lower portion of the cell stack. The secondary current collector may have a thickness corresponding to a step caused by the presence of the jig, and a problem caused by the step may be resolved.

In addition, the cell stack is designed to have a structure optimized for the space inside the battery case. Accordingly, the ratio of the cell stack occupied in the internal space of the battery case may be increased, and energy density may be increased.

When the provided secondary battery is used, high efficiency can be achieved and the number of charging and discharging can be reduced, for example, due to high energy density, which may result in a long life of the battery.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A secondary battery comprising:
a first current collector;
a second current collector arranged to face the first current collector;
a cell stack, which is provided between the first and second current collectors, the cell stack comprising a plurality of stacked unit cells;
first and second fixing members spaced apart from each other, the first and second fixing members being configured to fix the cell stack;
a plurality of primary current collectors, provided on side surfaces of the cell stack, wherein at least two of the primary current collectors are connected to the first current collector, and a remainder of the primary current collectors are connected to the second current collector; and
a case accommodating the first and second current collectors, the cell stack, the first and second fixing members, and the plurality of primary current collectors, wherein
the cell stack comprises a plurality of nonparallel linear side surfaces, at least one of the plurality of primary current collectors is on each of the linear side surfaces,
the first and second current collectors are on the cell stack between the first and second fixing members, and each of the first and second current collectors comprises a groove configured to accommodate portions of the first and second fixing members,
the cell stack comprises:
a first side surface that is linear;
a second side surface that is linear and nonparallel with the first side surface;
a third side surface that is linear and nonparallel with the first and second side surfaces; and
a fourth side surface that is linear and nonparallel with the first side surface, second side surface, and third side surface,
one primary current collector is provided on each of the first side surface, second side surface, third side surface, and fourth side surface, and
a portion of a current collector layer of a first electrode layer of each of the plurality of unit cells is connected to the primary current collector provided on the first side surface, and a remaining portion of the current collector layer of the first electrode layer to which the portion of the current collector layer of the first electrode layer is not connected is connected to the primary current collector provided on the second side surface.

2. The secondary battery of claim 1, wherein
each of the first and second fixing members comprises a jig covering portions of the side surfaces of the cell stack and covering portions of the first and second surfaces of the cell stack, and
the first and second fixing members are symmetrical.

3. The secondary battery of claim 1, wherein a number of primary current collectors present in the secondary battery is greater than or equal to four and less than or equal to a number of unit cells present in the cell stack.

4. The secondary battery of claim 1, wherein the first current collector comprises first and second bonding portions connected to at least two of the plurality of primary current collectors, the first and second bonding portions being spaced apart from each other.

5. The secondary battery of claim 1, wherein the second current collector comprises third and fourth bonding portions connected to at least two of the plurality of primary current collectors, the third and fourth bonding portions being spaced apart from each other.

6. The secondary battery of claim 1, wherein each of the first and second current collectors has a thickness corresponding to a distance between the cell stack and each of the first and second fixing members.

7. The secondary battery of claim 1, wherein the current collector layer of the first electrode layer of each of the plurality of unit cells comprises a tab connected to the primary current collector provided on one of the first and second side surfaces, and a position of a first tab formed in a portion of the current collector layer of the first electrode layer and a position of a second tab located on a remaining portion of the current collector layer of the first electrode layer in which the first tab is not formed are different from each other.

8. A secondary battery comprising of:

a first current collector;

a second current collector arranged to face the first current collector;

a cell stack, which is provided between the first and second current collectors, the cell stack comprising a plurality of stacked unit cells;

first and second fixing members spaced apart from each other, the first and second fixing members being configured to fix the cell stack;

a plurality of primary current collectors, provided on side surfaces of the cell stack, wherein at least two of the primary current collectors are connected to the first current collector, and a remainder of the primary current collectors are connected to the second current collector; and a case accommodating the first and second current collectors, the cell stack, the first and second fixing members, and the plurality of primary current collectors, wherein the cell stack comprises a plurality of nonparallel linear side surfaces, at least one of the plurality of primary current collectors is on each of the linear side surfaces, the first and second current collectors are on the cell stack between the first and second fixing members, and each of the first and second current collectors comprises a groove configured to accommodate portions of the first and second fixing members, the cell stack comprises:

a first side surface that is linear;

a second side surface that is linear and nonparallel with the first side surface;

a third side surface that is linear and nonparallel with the first and second side surfaces; and a fourth side surface that is linear and nonparallel with the first side surface, second side surface, and third side surface, one primary current collector is provided on each of the first side surface, second side surface, third side surface, and fourth side surface, and a portion of a current collector layer of a second electrode layer of each of the plurality of unit cells is connected to the primary current collector provided on the third side surface, and a remaining portion of the current collector layer of the second electrode layer to which the portion of the current collector layer of the second electrode layer is not connected is connected to the primary current collector provided on the fourth side surface.

9. The secondary battery of claim 8, wherein the current collector layer of the second electrode layer of each of the plurality of unit cells comprises a tab connected to the primary current collector provided on one of the third and fourth side surfaces, and a position of a first tab located in a portion of the current collector layer of the second electrode layer and a position of a second tab located on a remaining portion of the current collector layer of the second electrode layer in which the first tab is not located are different from each other.

10. The secondary battery of claim 1, wherein the first and second side surfaces are symmetrical to the third and fourth side surfaces.

11. The secondary battery of claim 1, wherein a current collector layer of a second electrode layer of each of the plurality of unit cells is connected to the primary current collectors provided on the third and fourth side surfaces.

12. The secondary battery of claim 1, wherein the cell stack occupies 85% or greater to less than 100% of an inner space of the case.

13. An electronic apparatus comprising a control unit configured to control at least an operation of the electronic apparatus; and a battery, wherein the battery comprises the secondary battery of claim 1.

14. The electronic apparatus of claim 13, further comprising a wearable device.

15. The secondary battery of claim 1, wherein each of the first and second current collectors comprises:

a first groove configured to accommodate a portion of the first fixing member, and a second groove configured to accommodate a portion of the second fixing member.

* * * * *